United States Patent
Orhan et al.

(10) Patent No.: US 10,594,383 B1
(45) Date of Patent: Mar. 17, 2020

(54) BEAM TRACKING FOR 5G MILLIMETER-WAVE SYSTEMS

(71) Applicant: Intel Corporation, Santa Clara, CA (US)

(72) Inventors: Oner Orhan, San Jose, CA (US);
Hosein Nikopour, San Jose, CA (US);
Shilpa Talwar, Cupertino, CA (US);
Yang-Seok Choi, Portland, OR (US);
Venkatesan Nallampatti Ekambaram, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,227

(22) Filed: Dec. 28, 2018

(51) Int. Cl.
*H04B 7/08* (2006.01)
*H04B 7/06* (2006.01)
*H04W 84/04* (2009.01)

(52) U.S. Cl.
CPC ............ *H04B 7/08* (2013.01); *H04B 7/0617* (2013.01); *H04W 84/042* (2013.01)

(58) Field of Classification Search
CPC .. H04B 7/0617; H04B 7/0691; H04B 7/0671; H04B 7/086; H04B 7/0865
See application file for complete search history.

(56) References Cited

U.S. PATENT DOCUMENTS

2018/0359646 A1* 12/2018 Tomeba .............. H04W 16/28

OTHER PUBLICATIONS

"Part 11: Wireless LAN Medium Access Control (MAC) and Physical Layer (PHY) Specifications: Amendment 3: Enhancements for Very High Throughput in the 60 GHz Band", IEEE Std 802.11ad. (Amendment to IEEE Std 802.11™—2012, as amended by IEEE (Std 802.11ae™—2012 and IEEE Std 802.11aa™—2012), (Dec. 28, 2012), 628 pgs.
Chen, Zhizang, et al., "Introduction to Direction-of-arrival Estimation", Book Description, Total pp. 194, Copyright 2010, 2 pgs.
Xiao, Zhenyu, et al., "Hierarchical Codebook Design for Beamforming Training in Millimeter-Wave Communication", IEEE Transactions on Wireless Communications, vol. 15, No. 5, pp. 3380-3392, (May 2016), 13 pgs.

* cited by examiner

*Primary Examiner* — Kevin Kim
(74) *Attorney, Agent, or Firm* — Schwegman Lundberg & Woessner, P.A.

(57) ABSTRACT

Aspects of mmWave beam tracking and beam sweeping are described, for example, an apparatus can include an antenna array including sub-arrays and processing circuitry configured to perform beamforming, beam tracking, and management thereof at the antenna sub-arrays. The processing circuitry can further be configured to determine the angle of arrival of a received signal received in response to performing the beamforming function and adjust phase shifters of the apparatus according to the angle of arrival. Other apparatuses, systems and methods are described.

17 Claims, 21 Drawing Sheets

BEAM TRACKING FOR 5G MILLIMETER-WAVE SYSTEMS

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to techniques, methods and apparatuses for beamforming and beam tracking operations.

BACKGROUND

Next-generation (5G and beyond) systems will make use of Massive Multiple Input Multiple Output (MIMO) architecture and millimeter wave (mmWave) operations. One of the main challenges of Massive MIMO systems is power consumption. Another challenge arises in beamforming, because of the increased latency associated with beamforming using all antenna elements present in Massive MIMO systems.

Furthermore, solutions proposed for beam tracking in mmWave systems are non-blind and require pilot signals to be sent in order to acquire beam direction. Such beam tracking can be time consuming and rely on Tx scanning across the beam space and Rx feedback. Because of the time used, such beam tracking may not be helpful in high-speed vehicular applications.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
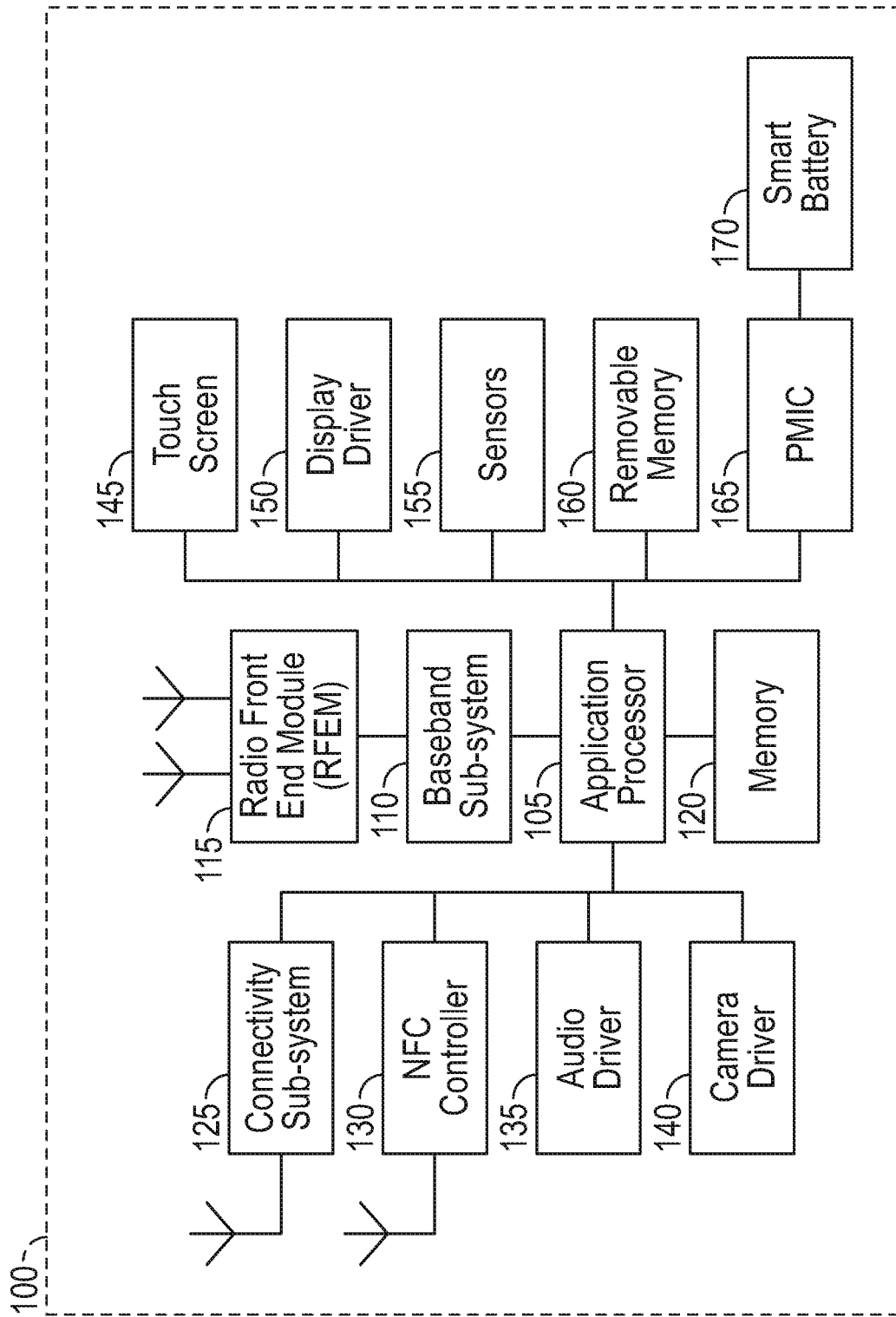
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface subsystem, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
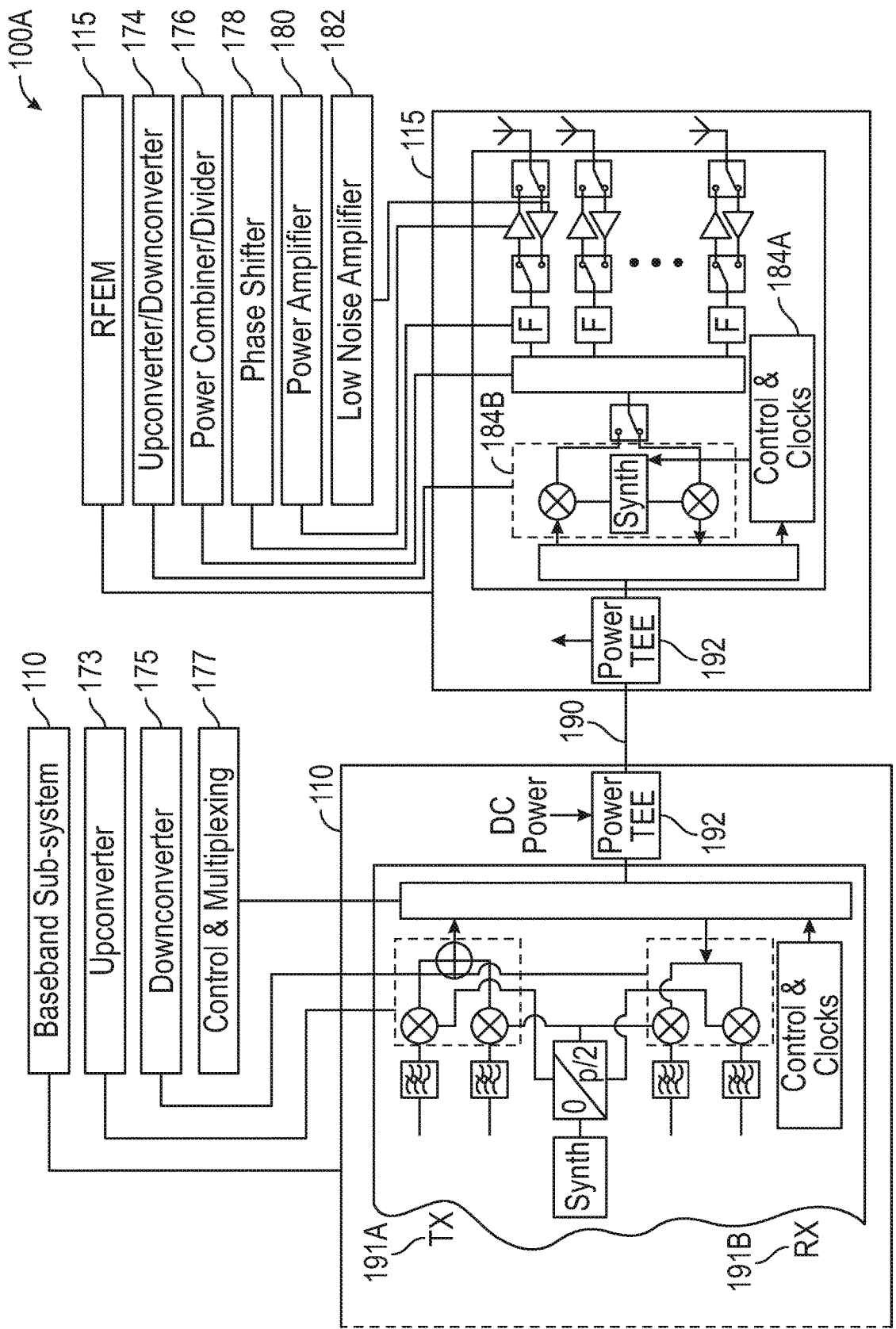
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with down-conversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including up-conversion/down-conversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. To avoid this issue, in some aspects, PAs 180 and LNAs 182 may be moved to the RFEM 115 with integrated antennas. In addition, the RFEM 115 may include up-conversion/down-conversion 174 so that the IF signals over the coaxial cable 190 can be at a lower frequency. Additional system context for mmWave 5G apparatuses, techniques and features is discussed herein below.

Figure 2:
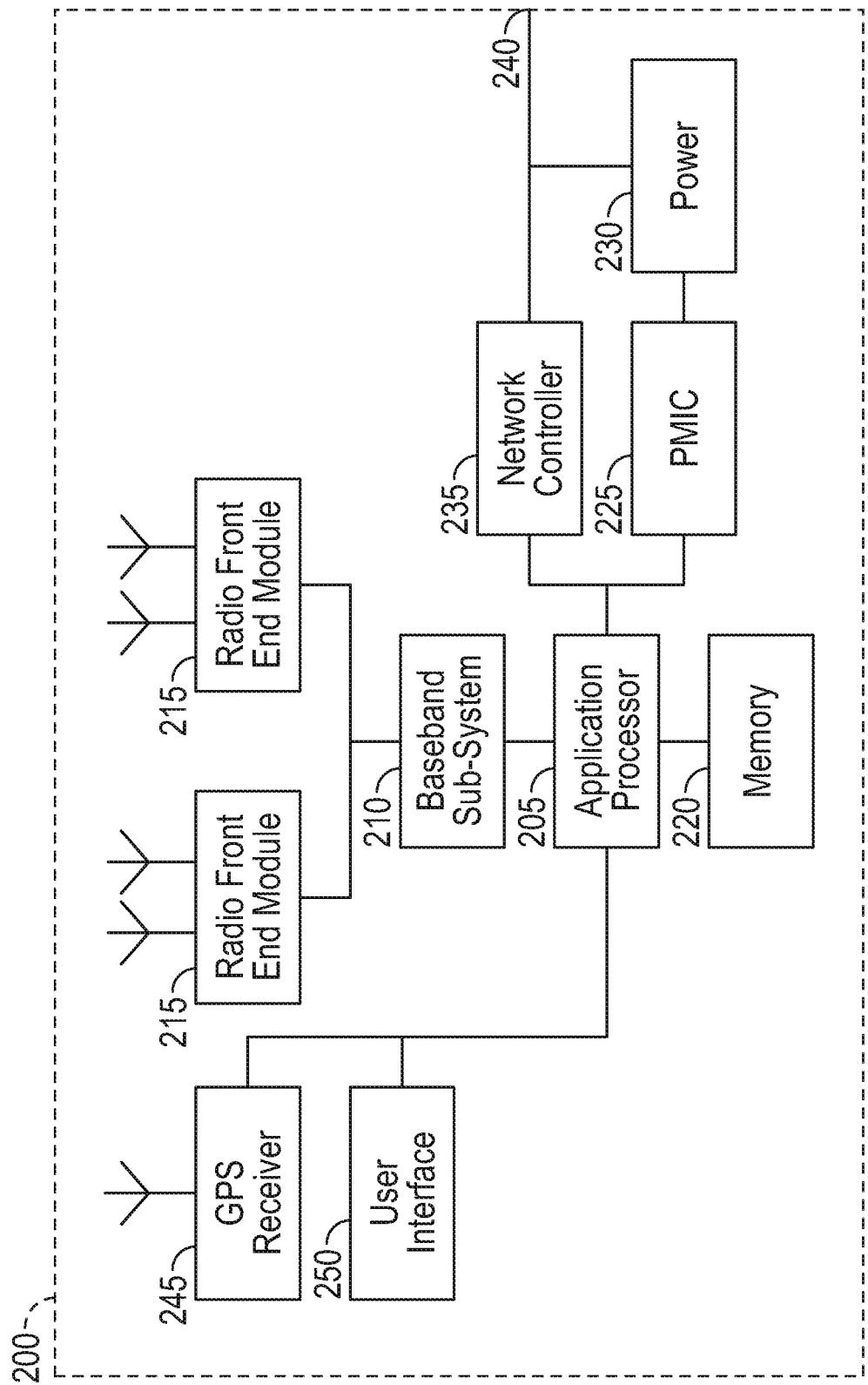
FIG. 2 illustrates an exemplary base station radio head according to some aspects.

FIG. 2 illustrates an exemplary base station or infrastructure equipment radio head according to some aspects. A base station may be termed, for example, an Evolved Node-B (eNB, eNodeB), or a New Radio Node-B (gNB, gNodeB). In some aspects, the base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magneto-resistive random access memory (MRAM), and/or a three-dimensional cross point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
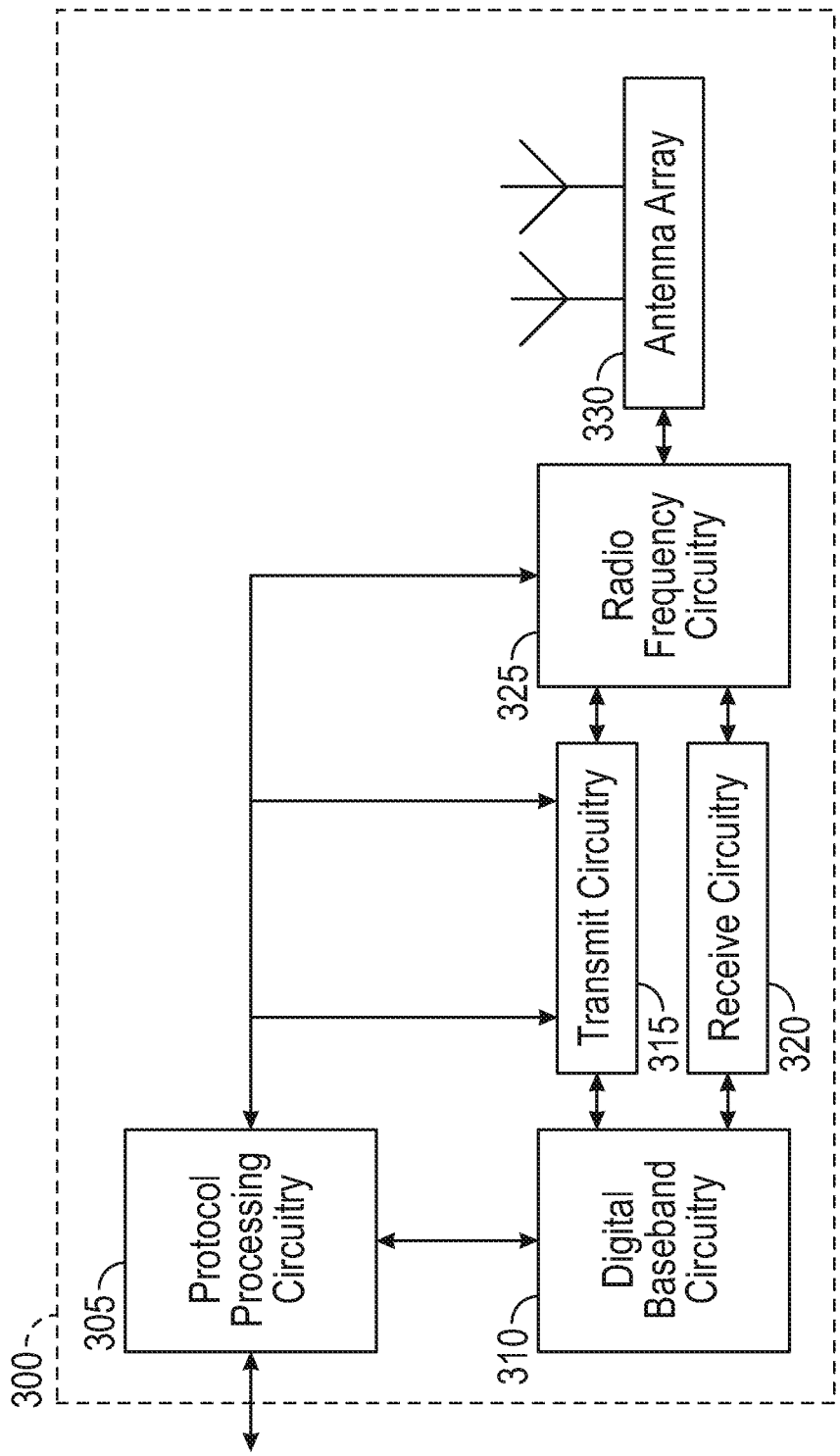
FIG. 3A illustrates exemplary millimeter wave communication circuitry according to some aspects.
Figure 3B:
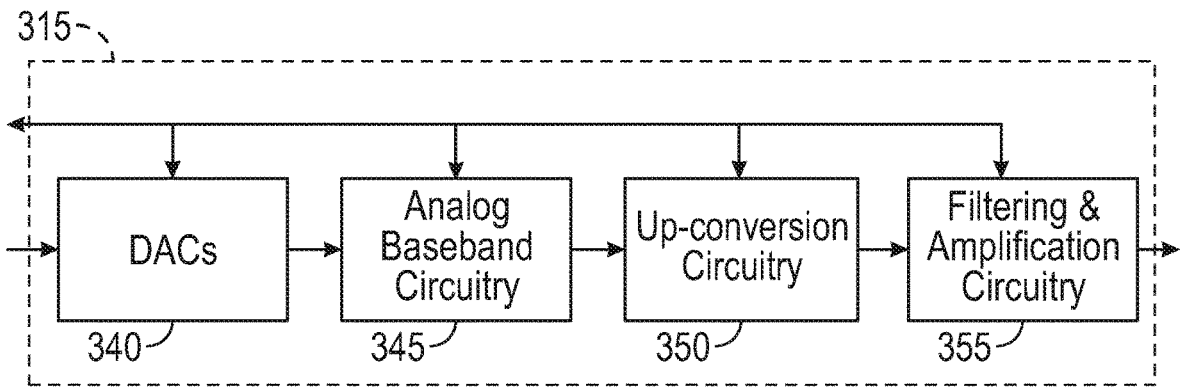
FIG. 3B illustrates aspects of exemplary transmit circuitry illustrated in FIG. 3A according to some aspects.
Figure 3C:
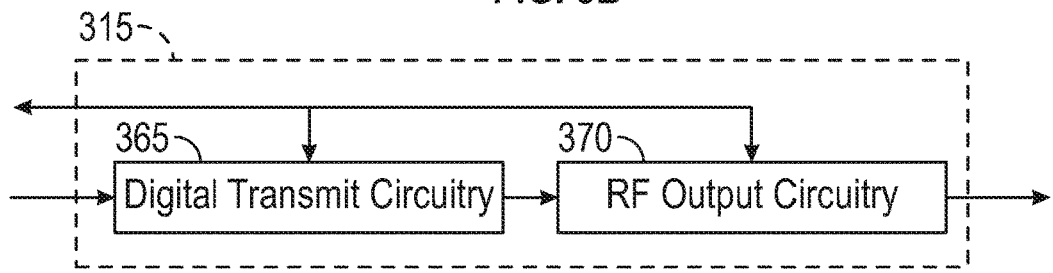
FIG. 3C illustrates aspects of exemplary transmit circuitry illustrated in FIG. 3A according to some aspects.
Figure 3D:
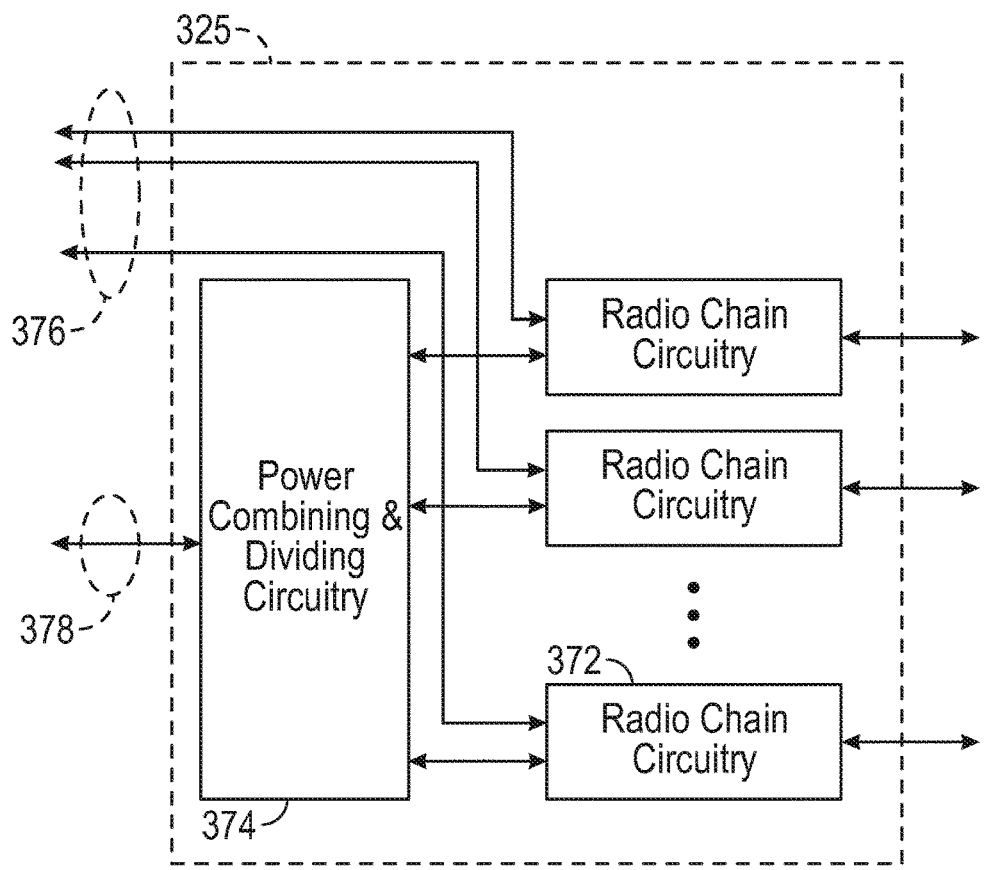
FIG. 3D illustrates aspects of exemplary radio frequency circuitry illustrated in FIG. 3A according to some aspects.
Figure 3E:
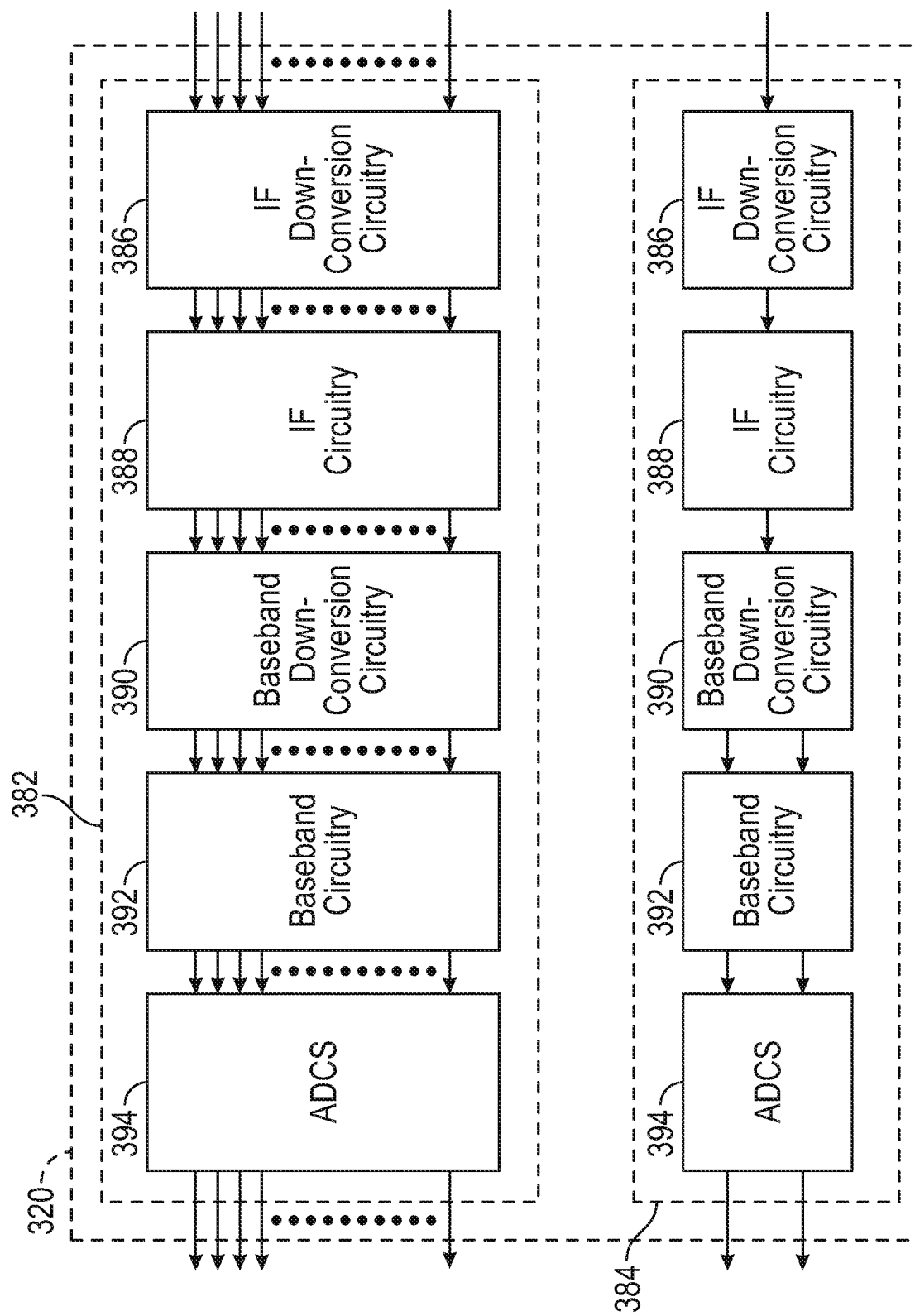
FIG. 3E illustrates aspects of exemplary receive circuitry in FIG. 3A according to some aspects.

FIG. 3A illustrates exemplary mmWave communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Millimeter wave communication circuitry 300 shown in FIG. 3A may be alternatively grouped according to functions. Components illustrated in FIG. 3A are provided here for illustrative purposes and may include other components not shown in FIG. 3A.

Millimeter wave communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter wave communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330. Millimeter wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
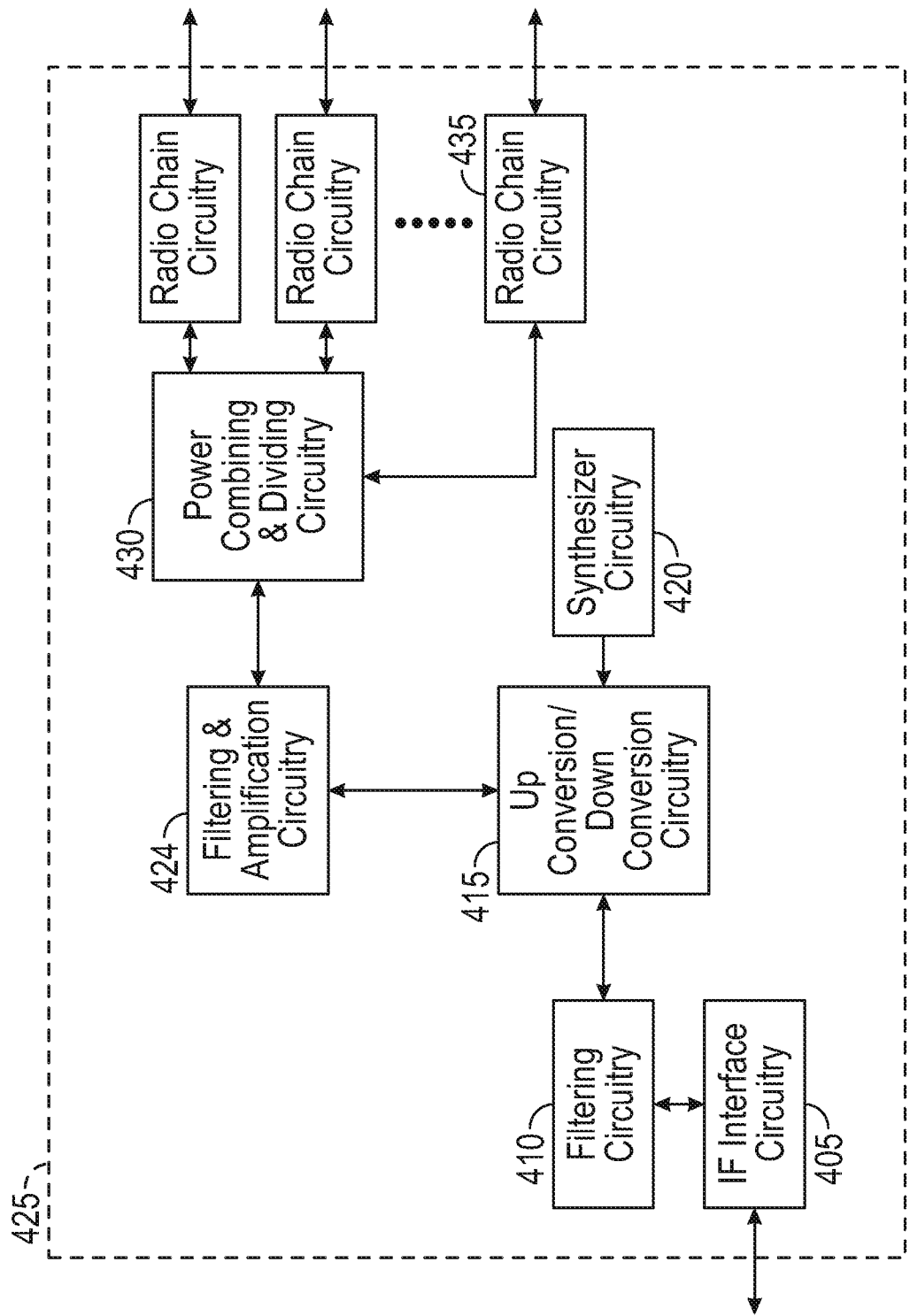
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5A:
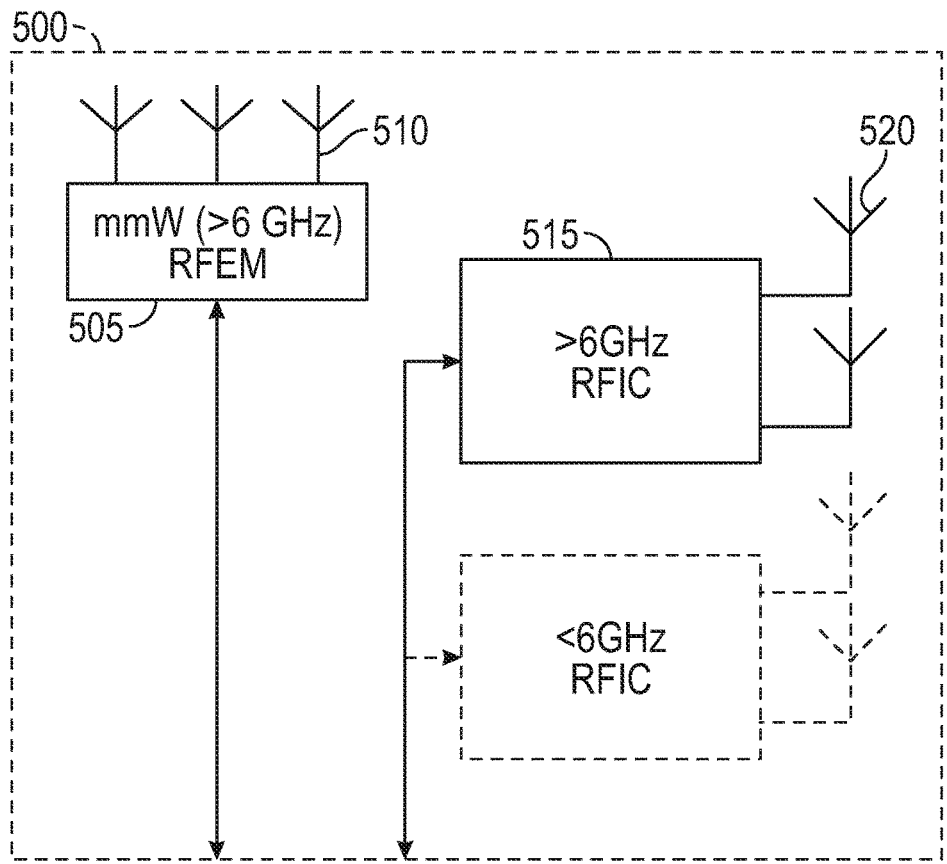
FIG. 5A illustrates an aspect of an exemplary radio front end module (RFEM) according to some aspects.
Figure 5B:
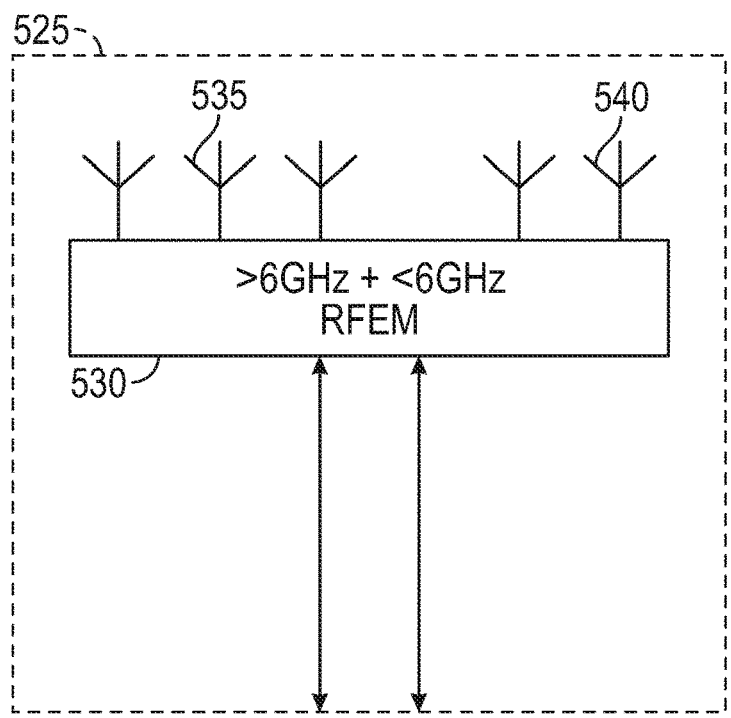
FIG. 5B illustrates an alternate aspect of an exemplary radio front end module, according to some aspects.

FIG. 5A and FIG. 5B illustrate aspects of a radio front end module useable in the circuitry shown in FIG. 1 and FIG. 2, according to some aspects. FIG. 5A illustrates an aspect of a radio front end module (RFEM) according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
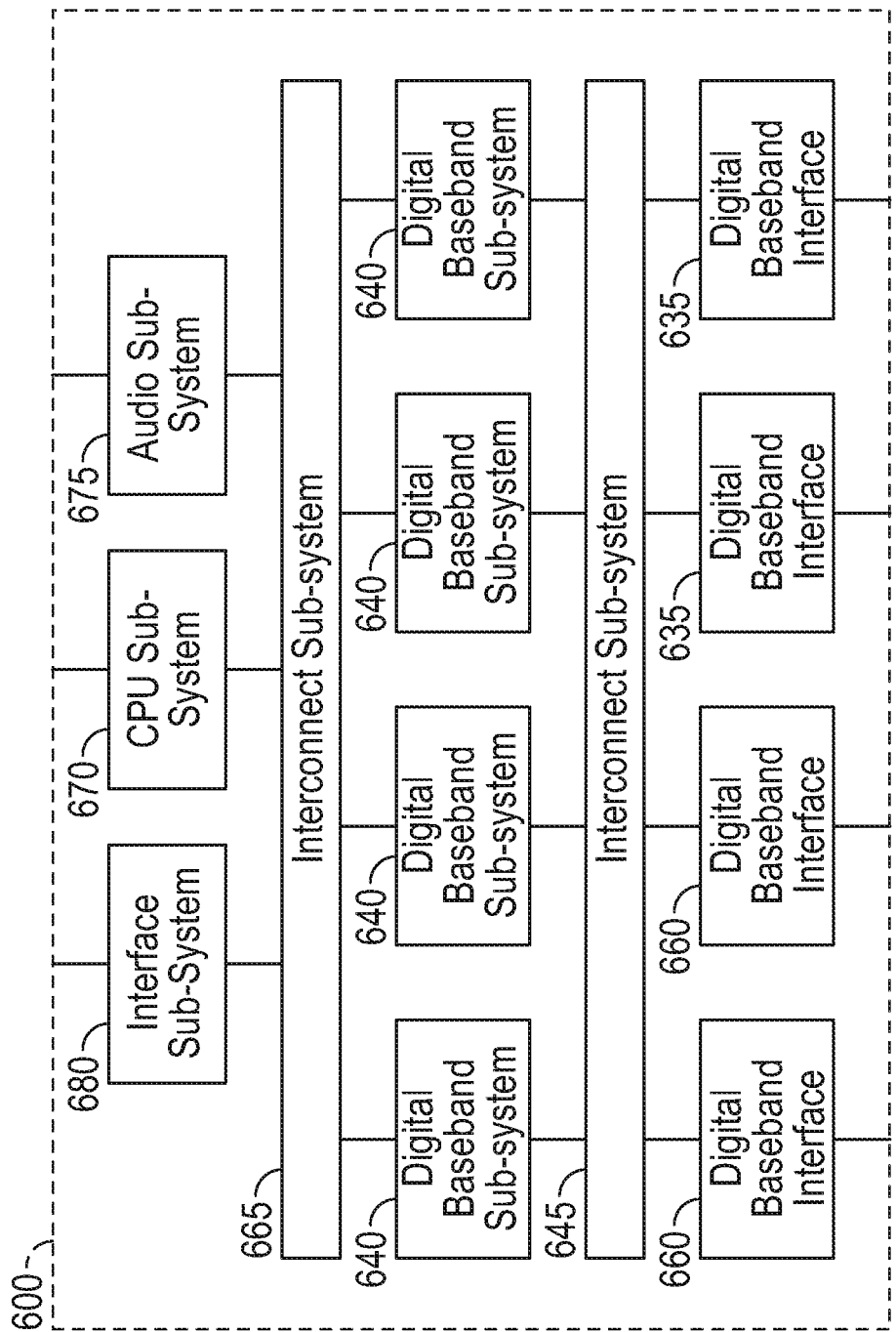
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
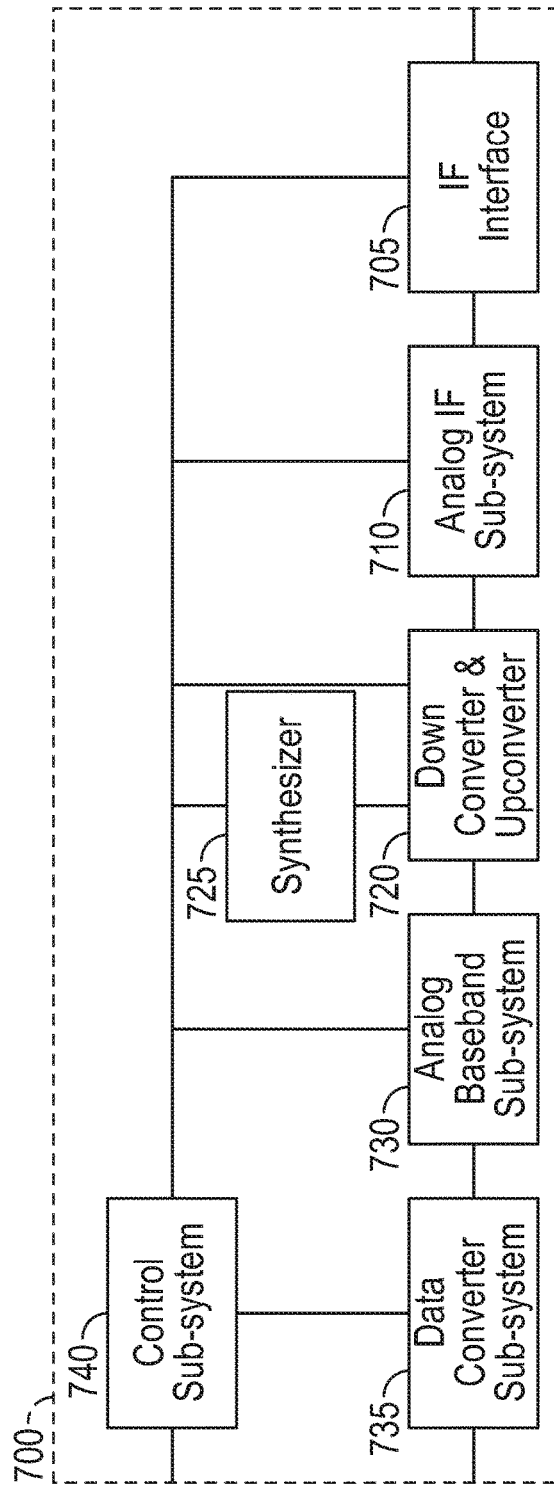
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
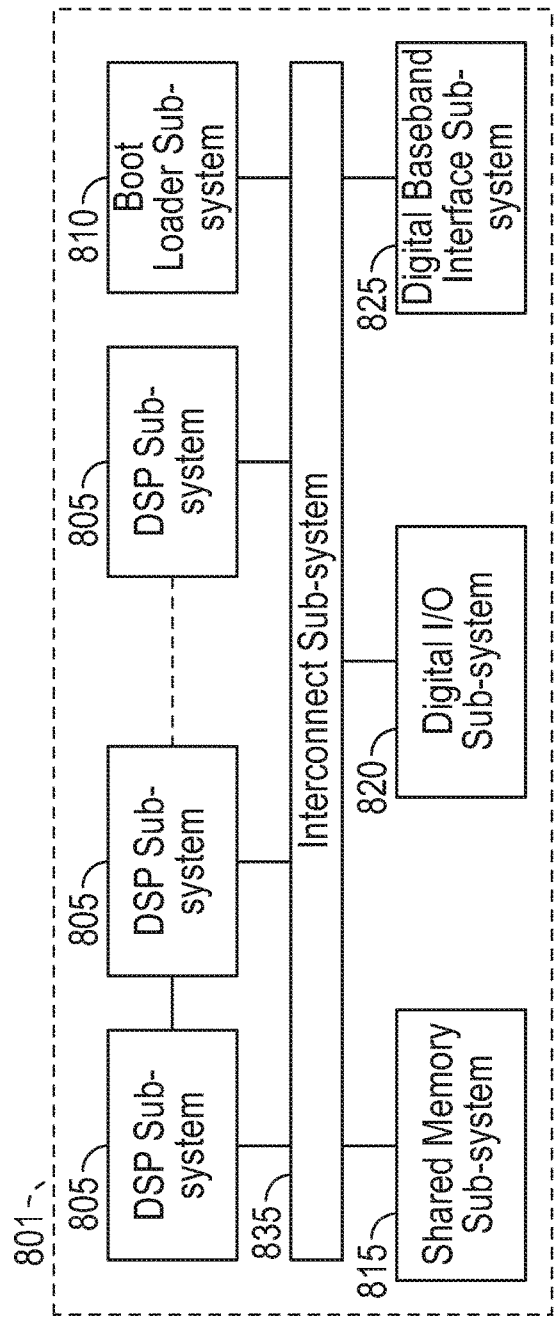
FIG. 8A illustrates an exemplary digital baseband subsystem, according to some aspects.
Figure 8B:
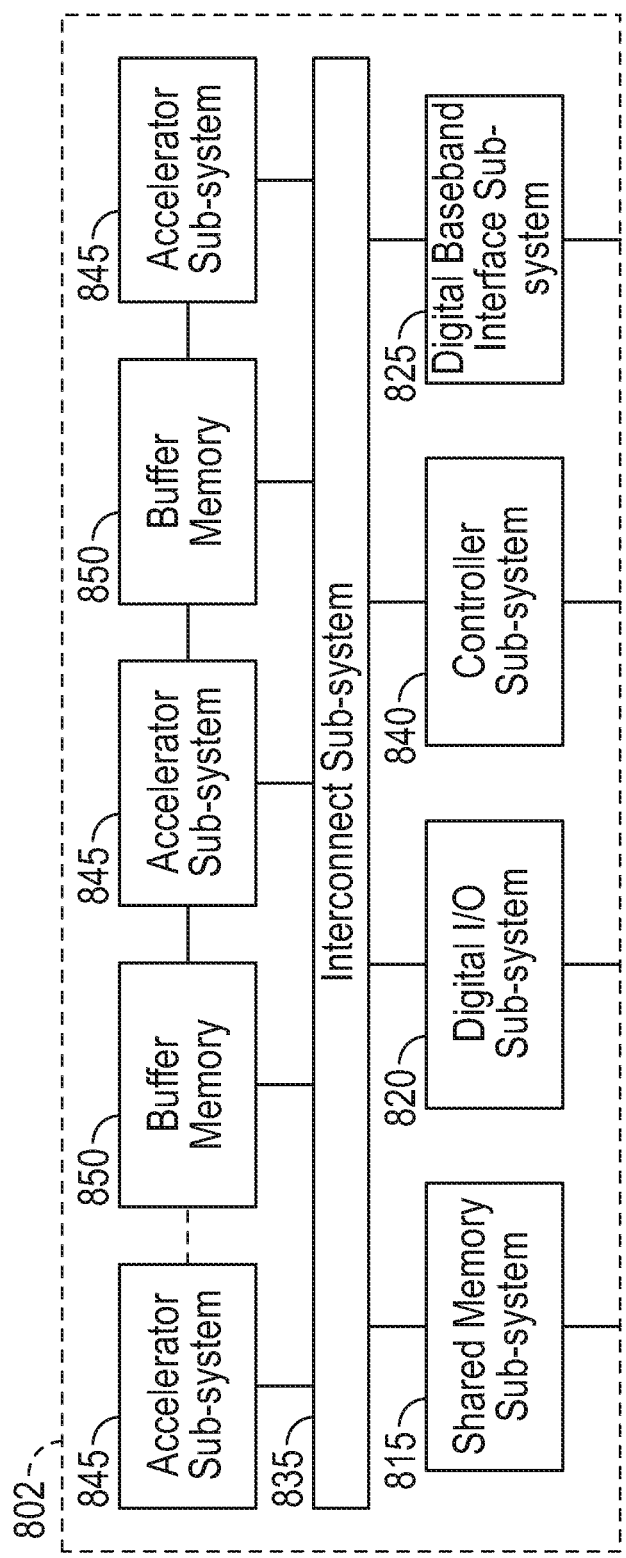
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
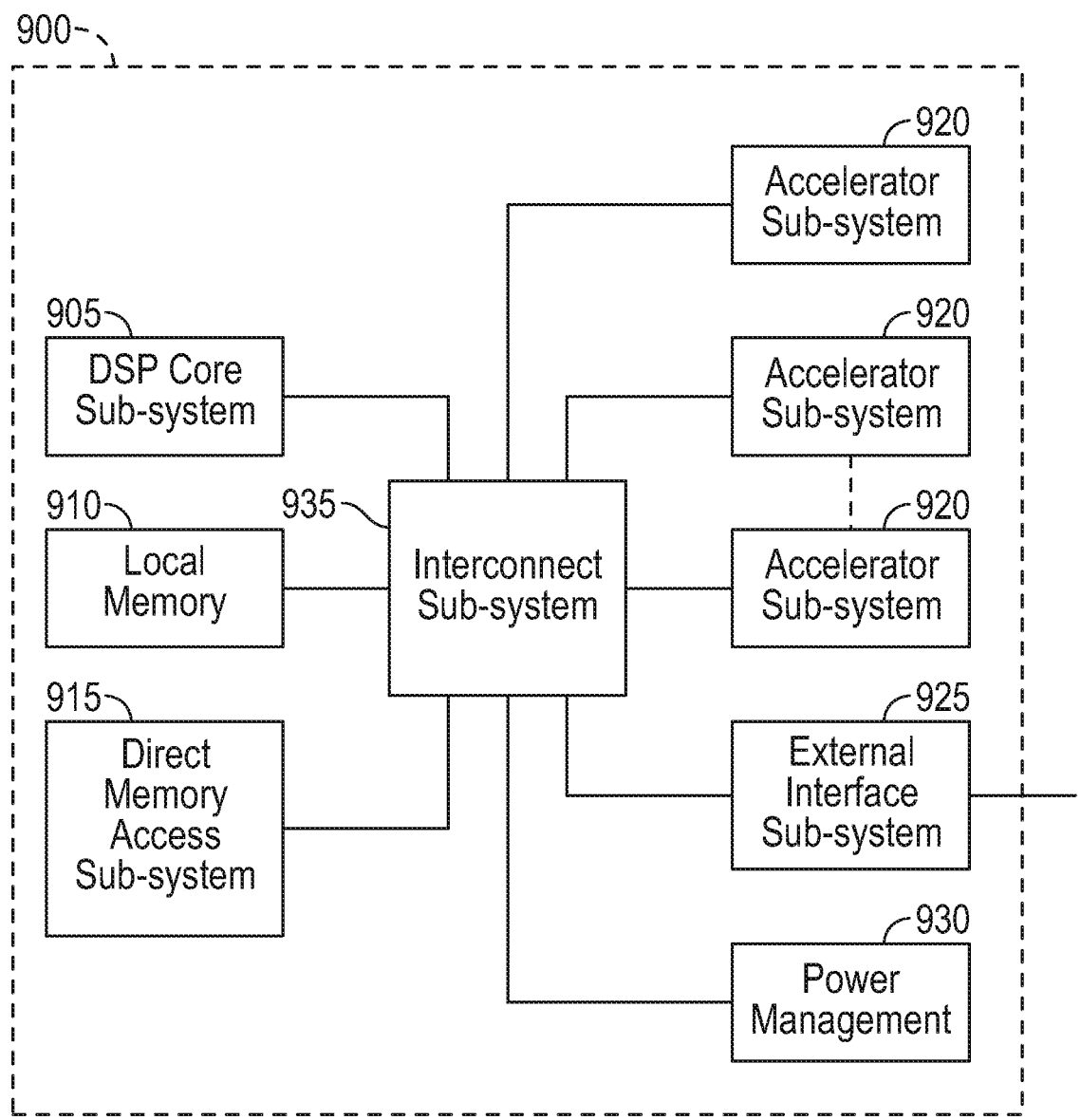
FIG. 9 illustrates an exemplary digital signal processor subsystem, according to some aspects.

FIG. 9 illustrates a digital signal processor (DSP) subsystem 900 according to some aspects.

In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Figure 10A:
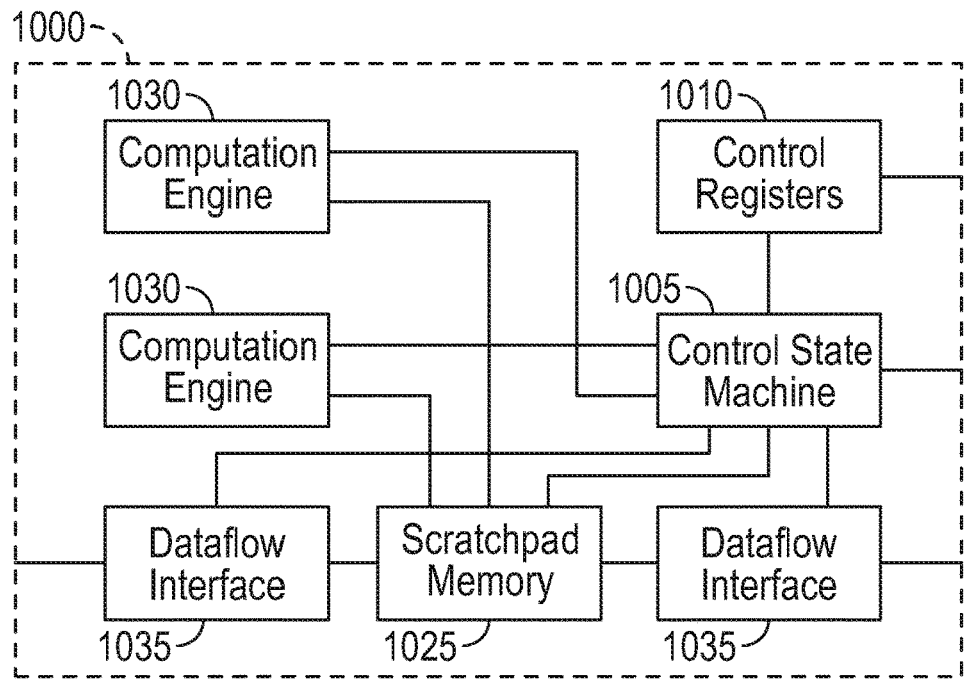
FIG. 10A illustrates an example of an accelerator subsystem, according to some aspects.
Figure 10B:
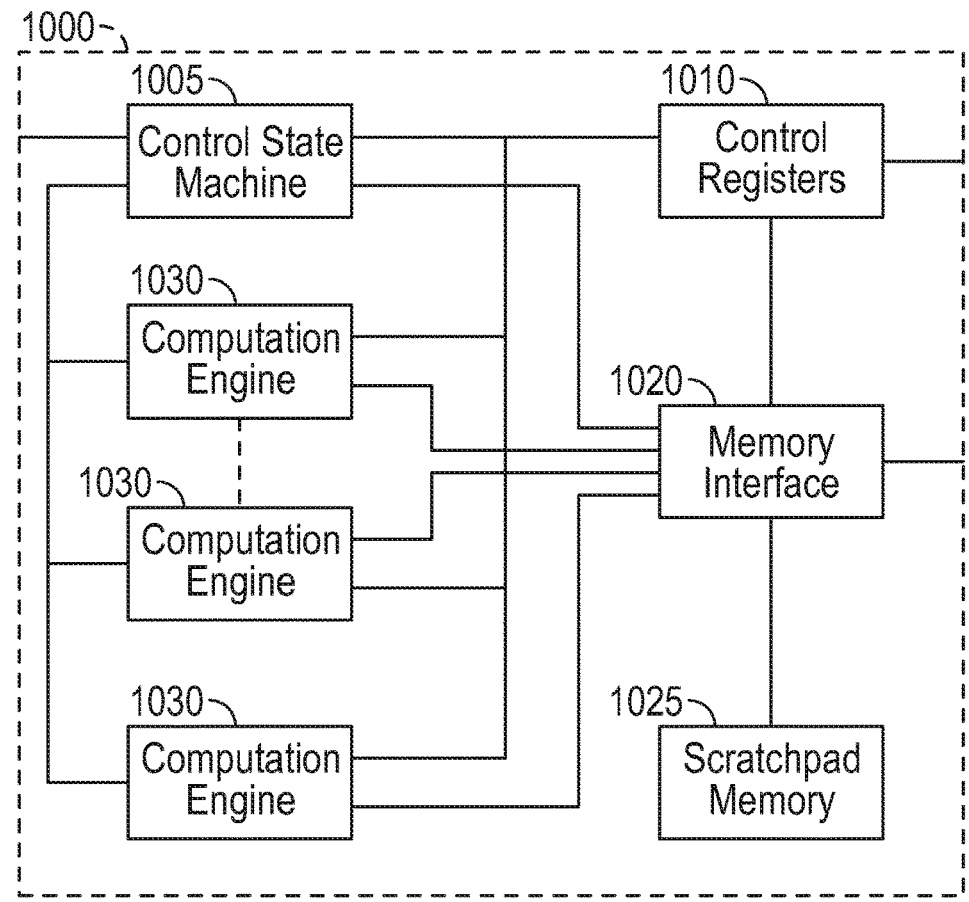
FIG. 10B illustrates an alternate exemplary accelerator subsystem, according to some aspects.

FIG. 10A illustrates an example of an accelerator subsystem 1000 according to some aspects. FIG. 10B illustrates an example of an accelerator subsystem 1000 according to some aspects.

In an aspect, accelerator subsystem 1000 may include one or more of each of control state machine 1005, control registers 1010, memory interface 1020, scratchpad memory 1025, computation engine 1030A . . . 1030N and dataflow interface 1035A, 1035B.

In an aspect, control registers 1010 may configure and control the operation of accelerator subsystem 1000, which may include one or more of: enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000.

Joint Analog and Digital Beam Tracking with Hybrid Phased Array

A mmWave communication system has been regarded as a promising technology for the next generation of cellular systems. MmWave communication systems can include multiple receive antennas. The small wavelength of mmWave frequencies allows for a large number of antennas to be included in a small area. The beamforming gain realized in systems with multiple antennas provides less inter-cell and intra-cell interference, high data rate and more cellular capacity.

However, one challenge with mmWave communication systems is power consumption in devices having multiple antennas. In order to reduce power costs, a hybrid phase array can be used, which combines received signals from different antennas in the analog domain after adjusting relative phases using phase shifters. This architecture reduces hardware cost of ADCs (RF-chain) and subsequent digital processing.

Analog phased arrays can combine signals in analog domain using phase shifters and requires only one pair of ADCs (RF-chain). However, analog combining may limit beamforming and beam tracking capability of a mmWave communication system. To support multi-user/multi-beamforming, a hybrid phased array architecture using more than one RF-chain can be provided.

Systems, methods and apparatuses according to aspects can perform joint analog and digital beam tracking using smaller arrays. Apparatuses, systems and methods according to aspects can use antenna arrays of a reduced size to perform quicker beam sweeping in the digital domain. After finding the best beam direction in the digital domain, apparatuses according to some aspects adjust the analog beamforming vector to have the largest beamforming gain. Aspects can further improve accuracy of angle of arrival estimations.

Figure 11:
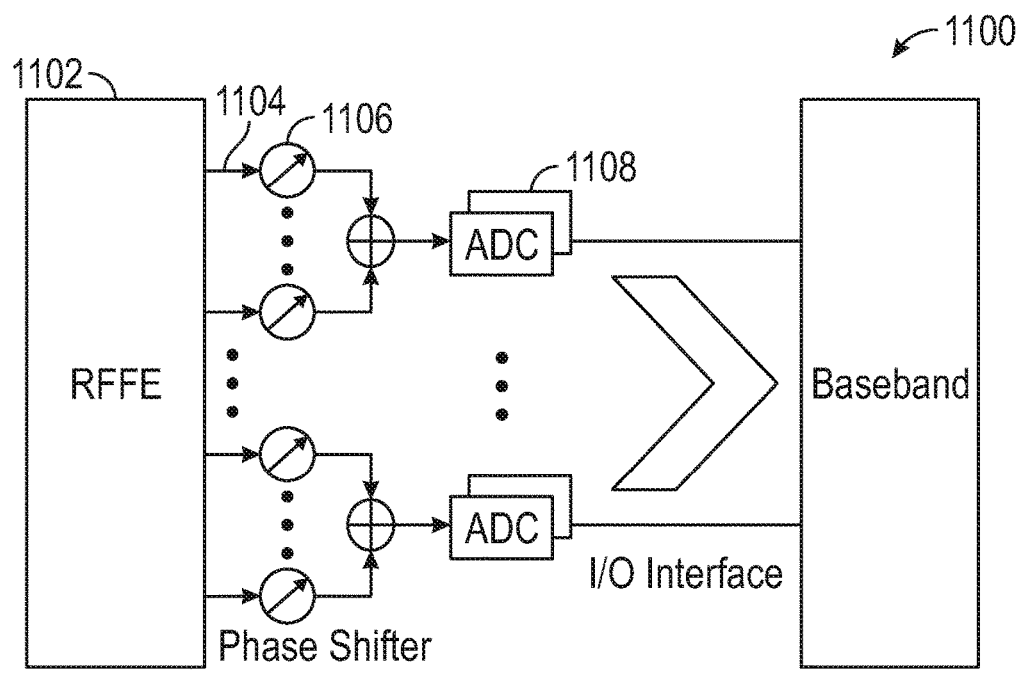
FIG. 11 illustrates a sub-array type hybrid architecture according to some aspects.

FIG. 11 illustrates a sub-array type hybrid architecture 1100 according to some aspects. Radio frequency front end (RFFE) 1102 provides multiple antenna inputs 1104. Phase shifters 1106 can be used to combine the antenna signals in the analog domain, and ADCs 1108 convert the combined signals to the digital domain before providing to baseband processor 1110. However, it will be appreciated that algorithms provided herein can be applied to digital and fully connected hybrid beamforming architectures.

Combining received signals in the analog domain (as shown in FIG. 11) limits initial access latency and beam tracking capability. For mobile users, this leads to frequent communication link failure. In aspects, a joint analog and digital beam tracking method is proposed for subarray type hybrid phase array architectures as depicted in FIG. 11. In aspects, operations of the joint analog and digital beam tracking method can be performed by processing circuitry (e.g., baseband processor 110 (FIG. 1)).

Figure 12:
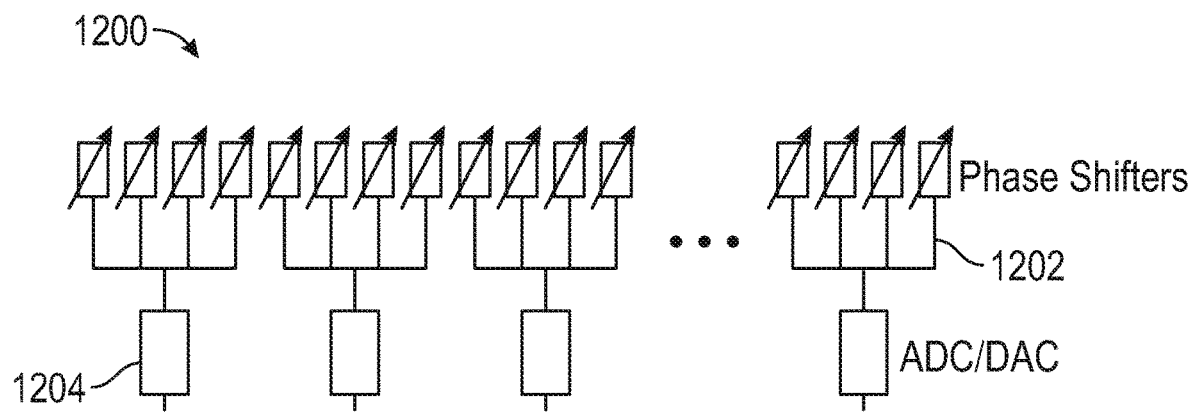
FIG. 12 illustrates a uniform array according to some aspects.

Consider a uniform array 1200 with $N_r$ antennas 1202 and $N_r^{rf}$ RF-chains 1204 at the receiver as shown in FIG. 12. Results can also be extended to rectangular arrays. Assume antenna spacing d between antennas 1202.

Denote the phase excitation of phase shifter $w=[w_0, w_1, \ldots, w_{N_r-1}]^T$ where $|w_n|=1, n=0, \ldots, N_r-1$. Let the array vector for azimuth angle of arrival θ be defined by Equation (1)

$$a(\theta) = \left[1, e^{j\frac{2\pi d \cos(\theta)}{\lambda}}, \ldots, e^{j\frac{2\pi d(N_r-1)\cos(\theta)}{\lambda}}\right] \quad (1)$$

where λ is the wavelength of the carrier frequency.

For mobile users, the angle of arrival will change over time and beamforming gain will degrade if w is not adapted to time varying θ. Algorithms according to some aspects track the time varying azimuth angle θ(t) and maximize beamforming gain according to the estimated angle of arrival.

The corresponding beamforming gain optimization problem can be written as follows:

$$\max_{w(t)} |a^H(\theta(t))w(t)| \quad (2)$$

To reduce complexity, a discrete set of beam steering angles are predefined in a codebook according to, for example, a standard of the Institute of Electrical and Electronics Engineers (IEEE) 802.11ad family of standards, and w(t) is set to one of the codebook vectors that maximizes beamforming gain. However, following this approach means that beam sweeping time becomes large when using analog phase shifters because an analog antenna array can look at only one beam direction in the codebook at a time. In addition, due to quantization of the steering angle, systems can experience beam steering mismatch.

However, beam steering latency and beam steering error can be reduced by dividing the antenna array into small subarrays. Systems and algorithms according to some aspects can perform beam steering with wide beam patterns using subarrays of a hybrid phased array to find the exact angle of arrival using a digital RF-chain. Then, the analog phase shifters can be adjusted according to the estimated angle of arrival, according to algorithms provided below, implemented in processing circuitry (e.g., baseband processor 110 (FIG. 1)).

Because systems according to aspects are based on a hybrid phased array, the received signals of each subarray (or in general received signals corresponding to an RF chain) are combined in the analog domain after phase shifters and before ADC/DAC. For a given phase shifter excitation, w, the beam formed signal at the receiver is observed as follows:

$$r(t) = \begin{bmatrix} w_0, w_1, \ldots, w_{\frac{N_r}{N_r^{rf}}-1} & 0 & 0 \\ 0 & \ddots & 0 \\ 0 & 0 & w_{N_r-\frac{N_r}{N_r^{rf}}-1}, w_{N_r-\frac{N_r}{N_r^{rf}}}, \ldots, w_{N_r-1} \end{bmatrix} \quad (3)$$

$$a(\theta(t))s + n$$

where r(t) is received signal, s is transmitted signal, n is additive white Gaussian noise.

A blind angle of arrival estimation algorithm could be used to estimate θ(t). However, as the accuracy of angle of arrival estimation depends on w and processing circuitry in some aspects can implement a method outlined below to find the analog beam steering vector w.

Figure 13:
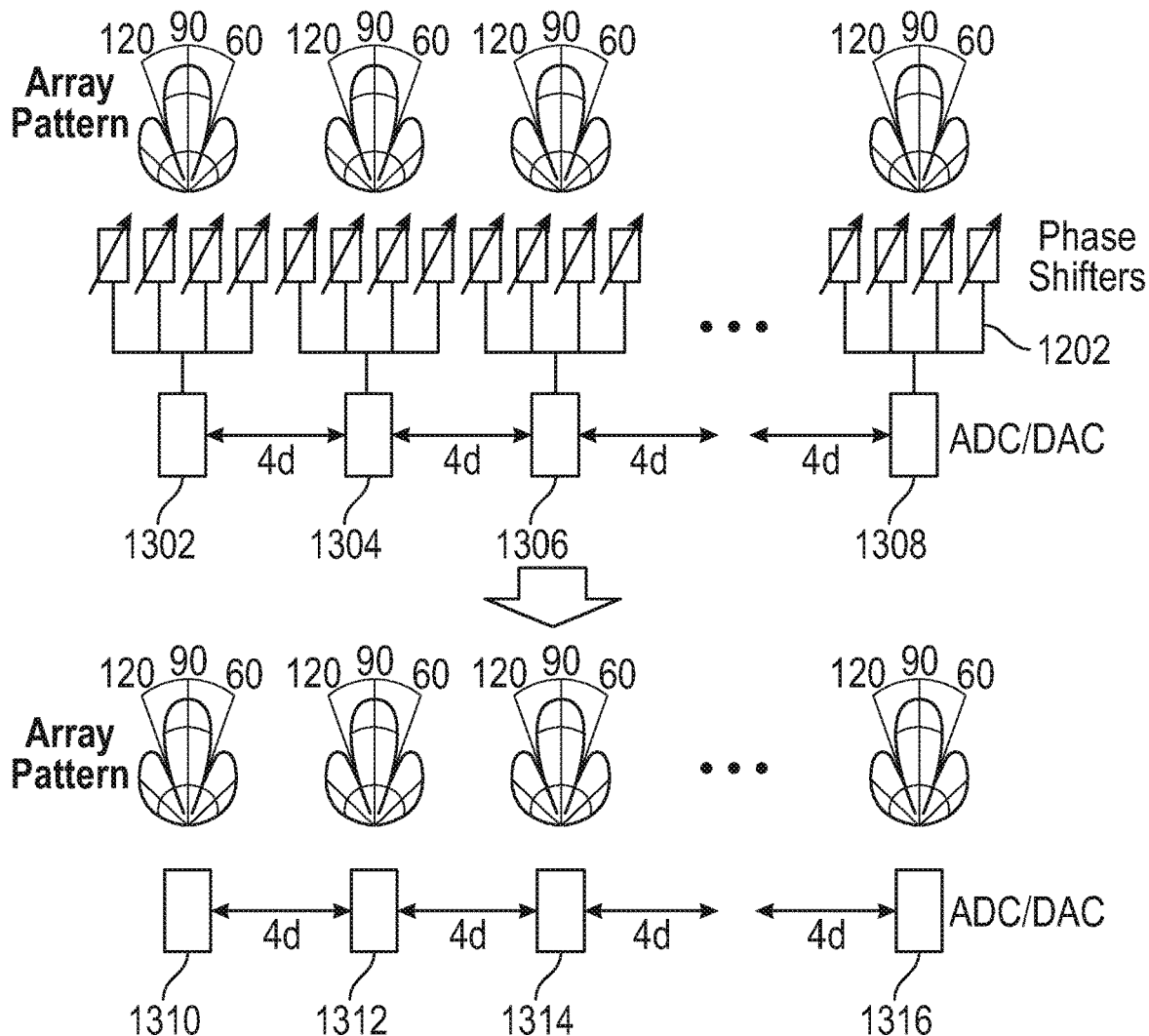
FIG. 13 illustrates equivalent antenna arrays that can be defined according to some aspects.

FIG. 13 illustrates how equivalent antenna arrays can be defined according to some aspects. In an initial operation for finding the analog beam steering vector w, processing circuitry can set the initial sub-array beamforming vectors. In aspects, the processing circuitry uses the same beamforming vector for each sub-array in order to cause an equivalent sub-array to have the same array pattern, as shown in FIG. 13. However, the results can be generalized to different array patterns. With reference to FIG. 13, if the same beamforming vector is applied to each subarray 1302, 1304, 1306, 1308, the equivalent antenna array 1310, 1312, 1314, 1316 can be considered to be a $N_r^{rf}$ antenna array with antenna patterns equal to array pattern of subarrays 1302, 1304, 1306, 1308 as depicted.

However, after the processing circuitry implements subarray beamforming, using the initial sub-array beamforming vectors, when current angle of arrival estimation algorithms are applied to received signal $$r(t), \frac{N_r}{N_r^{rf}} \frac{2d}{\lambda}$$

ambiguous (grating) arrival angles are observed at receiver circuitry. This is because the effective inter-element spacing becomes $$\frac{N_r}{N_r^{rf}} d,$$

which is larger than λ/2. For example, if $$d = \lambda/2 \text{ and } \frac{N_r}{N_r^{rf}} = 4,$$

four grating angle of arrival estimations become necessary, and it is not possible to find correct angle of arrival. Therefore, to find correct angle of arrival, processing circuitry will steer the beam of subarrays towards these four grating directions in some aspects, and measure power gain of each grating direction. The processing circuitry will select the grating direction having the highest gain according to Equation (4), which uses a discrete Fourier transform (DFT) codebook with size $$\frac{N_r}{N_r^{rf}} \times \frac{N_r}{N_r^{rf}}$$

at subarrays:

$$DFT \in \mathbb{C}^{\frac{N_r}{N_r^{rf}} \times \frac{N_r}{N_r^{rf}}} = \quad (4)$$

$$\begin{bmatrix} DFT_0^T \\ \vdots \\ DFT_k^T \\ \vdots \\ DFT_{\frac{N_r}{N_r^{rf}}-1}^T \end{bmatrix} = \begin{bmatrix} 1 & 1 & \cdots & 1 \\ \vdots & \vdots & \vdots & \vdots \\ 1 & e^{j\frac{2\pi N_r^{rf}}{N_r}k} & \cdots & e^{-j\frac{2\pi\left(\frac{N_r}{N_r^{rf}}-1\right)N_r^{rf}}{N_r}k} \\ \vdots & \vdots & \vdots & \vdots \\ 1 & e^{j\frac{2\pi N_r^{rf}}{N_r}\left(\frac{N_r}{N_r^{rf}}-1\right)} & \cdots & e^{j\frac{2\pi\left(\frac{N_r}{N_r^{rf}}-1\right)N_r^{rf}}{N_r}\left(\frac{N_r}{N_r^{rf}}-1\right)} \end{bmatrix}$$

This codebook has $$\frac{N_r}{N_r^{rf}}$$

beam directions which is sufficient to steer the beam all grating directions. It is sufficient to use DFT codebook to steer beam towards grating directions, according to a mathematical proof provided below.

Given grating direction $\theta_{g1}$ we can write:

$$e^{j\frac{2\pi dN_r \cos(\theta_{g1})}{\lambda N_r^{rf}}} = e^{j2\pi k + \varphi}, k = 0, 1, 2, 3 \ldots \text{ and } \varphi \in [0, 2\pi) \quad (5)$$

where the left hand side of equation is obtained from array vector of equivalent antenna array, i.e.

$$a_{equivalent\ array}(\theta_{g1})\left[1, e^{j\frac{2\pi dN_r \cos(\theta_{g1})}{\lambda N_r^{rf}}}, \ldots, e^{j\frac{2\pi dN_r\left(\frac{N_r}{N_r^{rf}}-1\right)\cos(\theta_{g1})}{\lambda N_r^{rf}}}\right] \quad (6)$$

and the right hand side of equation follows from the periodicity of the complex exponential function.

Grating angles are given according to:

$$\theta_{gk} = \cos^{-1}\left(\frac{k\lambda N_r^{rf}}{dN_r} + \psi\right), k = 1, 2, 3, \ldots \quad (7)$$

where ψ is auxiliary variable for $$\frac{\varphi \lambda N_r^{rf}}{2\pi d N_r}.$$

If the steering angle θ of array vector of subarray is replaced with the grating angles in (7):

$$a_{subarray}(\theta) = \left[1, e^{j\frac{2\pi d \cos(\theta)}{\lambda}}, \ldots, e^{j\frac{2\pi d \left(\frac{N_r}{N_r^{rf}}-1\right)\cos(\theta)}{\lambda}}\right] \quad (8)$$

we obtain discrete Fourier transform (DFT) codebook with size $$\frac{N_r}{N_r^{rf}} \times \frac{N_r}{N_r^{rf}}$$

as given by:

$$\begin{bmatrix} 1 \\ e^{j\frac{\varphi N_r^{rf}}{N_r}} \\ \vdots \\ e^{j\varphi \left(\frac{N_r}{N_r^{rf}}-1\right)\frac{N_r^{rf}}{N_r}} \end{bmatrix}^T \begin{bmatrix} 1 & 1 & \ldots & 1 \\ \vdots & \vdots & \vdots & \vdots \\ 1 & e^{j\frac{2\pi N_r^{rf}}{N_r}k} & \ldots & e^{j\frac{2\pi \left(\frac{N_r}{N_r^{rf}}-1\right)N_r^{rf}}{N_r}k} \\ \vdots & \vdots & \vdots & \vdots \\ 1 & e^{j\frac{2\pi N_r^{rf}}{N_r}\left(\frac{N_r}{N_r^{rf}}-1\right)} & \ldots & e^{j\frac{2\pi \left(\frac{N_r}{N_r^{rf}}-1\right)N_r^{rf}}{N_r}\left(\frac{N_r}{N_r^{rf}}-1\right)} \end{bmatrix} = \quad (9)$$

$$\begin{bmatrix} 1 \\ e^{j\frac{\varphi N_r^{rf}}{N_r}} \\ \vdots \\ e^{j\varphi\left(\frac{N_r}{N_r^{rf}}-1\right)\frac{N_r^{rf}}{N_r}} \end{bmatrix}^T \begin{bmatrix} DFT_0^T \\ \vdots \\ DFT_k^T \\ \vdots \\ DFT_{\frac{N_r}{N_r^{rf}}-1}^T \end{bmatrix}$$

where φ is found as described below.

Above, it was proven that the DFT codebook at subarrays is sufficient to have beamforming gain towards the direction of grating angle. However, for each DFT direction, φ needs to be estimated to find accurate $\theta_{gk}$, k=1, 2 . . . .

To estimate φ, processing circuitry applies one of the rows of the DFT beamforming codebook to each subarray sequentially, and for each case the processing circuitry estimates the angle of arrival using digital angle of arrival estimation algorithms. The estimation of angle of arrivals can be extended to pilot-based methods in which beam tracking is performed only subsequent to receiving a pilot sequence. The procedure can be written as follows: first, the processing circuitry applies $DFT_k^T$ beamforming vector to each sub-array. Next, the processing circuitry estimates angle of arrival θ with any blind algorithm such that $$f_k = \max_{\theta_k} |a^H(\theta_k) W^H r(t)|^2 \quad (10)$$

such that $$\cos^{-1}\left(\frac{k\lambda N_r^{rf}}{dN_r}\right) \leq \theta_k < \cos^{-1}\left(\frac{(k+1)\lambda N_r^{rf}}{dN_r}\right) \quad (11)$$

where $$W = \begin{bmatrix} DFT_k^T & \ldots & 0 \\ \vdots & \ddots & \vdots \\ 0 & \ldots & DFT_k^T \end{bmatrix} \quad (12)$$

Subsequent to executing Equations (10)-(12), for each direction, the processing circuitry measures received signal strength and selects the strongest $\hat{\theta}=\theta_{k^*}$, where $$k^* = \underset{k}{\mathrm{argmax}} f_k \quad (13)$$

Setting final phase values according to estimated angle of arrival: After selecting best DFT direction for subarray and finding correct angle of arrival, the processing circuitry sets final phase values according to the estimated angle of arrival. For example, the processing circuitry sets w as follows:

$$w \leftarrow a(\hat{\theta}) \quad (14)$$

where $a(\hat{\theta})$ was defined in (1) above.

The above process can be summarized using examples based on different scenarios. A first scenario, implementing beam tracking algorithms for fast varying channels, can be summarized according to the below.

Given as inputs: total number of antennas $N_r$, and RF-chains $N_r^{rf}$

For $$k = 0 \text{ to } \frac{N_r}{N_r^{rf}} - 1,$$

the processing circuitry applies beamforming vector $DFT_k^T$ to each sub-array. Next, the processing circuitry estimates the angle of arrival θ with any blind algorithm such that $$f_k = \max_{\theta_k} |a^H(\theta_k) W^H r(t)|^2,$$

such that $\cos^{-1}\left(\frac{k\lambda N_r^{rf}}{dN_r}\right) \leq \theta_k < \cos^{-1}\left(\frac{(k+1)\lambda N_r^{rf}}{dN_r}\right),$ and where $W = \begin{bmatrix} DFT_k^T & \ldots & 0 \\ \vdots & \ddots & \vdots \\ 0 & \ldots & DFT_k^T \end{bmatrix}.$ Then, $\hat{\theta}=\theta_k$ which has the maximum $$f_k, k = 0, \ldots, \frac{N_r}{N_r^{rf}} - 1.$$

Finally, set $w \leftarrow a(\hat{\theta})$, where $a(\hat{\theta})$ is defined in (1).

Similarly, a second scenario applies to beam tracking algorithms for slow-varying channels. In this case, assuming the best DFT beam direction, $DFT_k^T$, is known for subarrays. The processing circuitry adjust w for better beamforming towards the direction of the new channel:

Given as inputs: total number of antennas N, and RF-chains $N_r^{rf}$, and $DFT_{k*}^T$, apply $DFT_{k*}^T$ beamforming vector to each sub-array. Next the processing circuitry estimates angle of arrival θ with any blind algorithm such that $\hat{\theta} = \arg\max_\theta |a^H(\theta) W^H r(t)|^2$ such that $\cos^{-1}\left(\frac{k^* \lambda N_r^{rf}}{dN_r}\right) \leq \theta < \cos^{-1}\left(\frac{(k^*+1) \lambda N_r^{rf}}{dN_r}\right)$, and where $W = \begin{bmatrix} DFT_{k*}^T & \cdots & 0 \\ \vdots & \ddots & \vdots \\ 0 & \cdots & DFT_k^T \end{bmatrix}$.

Finally set $w \leftarrow a(\hat{\theta})$, where $a(\hat{\theta})$ defined in (1).

Figure 14:
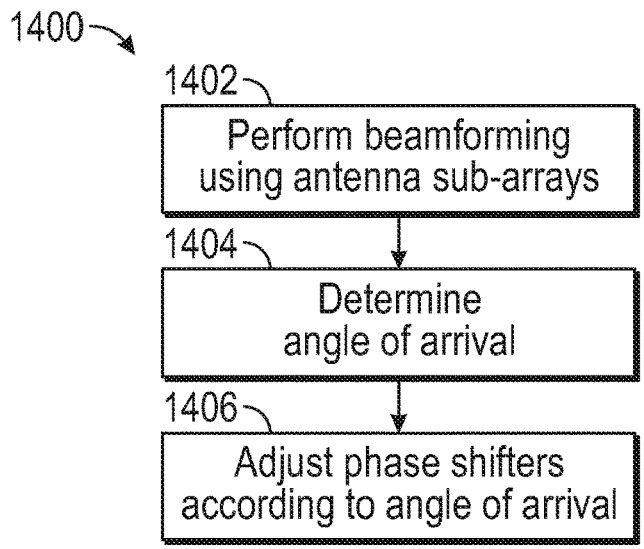
FIG. 14 illustrates a method of joint analog and digital beam tracking with a hybrid phased array according to some aspects.

FIG. 14 illustrates a method 1400 of joint analog and digital beam tracking with a hybrid phased array according to some aspects. Some operations of the method 1400 can be performed by a processing circuitry such as baseband processor 110 (FIG. 1).

Method 1400 begins with operation 1402 with the processing circuitry performing a beamforming function at antenna sub-arrays. For example, beamforming can be performed at $$\frac{N_r}{N_r^{rf}}$$

where $N_r$ is the number of antennas (e.g., antennas 1202) and $N_r^{rf}$ is the number of RF-chains (e.g., RF-chain 1204) of the apparatus (e.g., user device 100 (FIG. 1). The beamforming can be performed using a beamforming vector that has been applied to each antenna sub-array of the $$\frac{N_r}{N_r^{rf}}$$

sub-arrays such that an array pattern of each antenna sub-array is substantially the same, as illustrated in FIG. 13.

Method 1400 can continue with operation 1404 with the processing circuitry determining the angle of arrival of a received signal received in response to performing the beamforming function. The angle of arrival can be determined by steering each sub-array toward each of $$\frac{N_r}{N_r^{rf}} \frac{2d}{\lambda}$$

grating angles, where d is the distance between each sub-array and λ is the wavelength of the received signal, and then selecting the grating angle having the largest measured power gain as the angle of arrival, as discussed above with reference to Equations (4). The steering can be performed using a DFT codebook with a size of $$\frac{N_r}{N_r^{rf}} \times \frac{N_r}{N_r^{rf}}.$$

Method 1400 can continue with operation 1406 with the processing circuitry adjust phase shifters of the apparatus according to the angle of arrival.

A Low Power/Complexity Beam Tracking Method Using Multi-Finger Beam

Analog phased arrays can be used in massive MIMO and mmWave systems to reduce hardware costs associated with ADCs. An analog phased array architecture combines signals received in the analog domain using phase shifters and uses only one pair of ADCs (RF-chain). However, analog combining may limit beamforming and beam tracking capability of a mmWave communication system when narrow beams (e.g. DFT beamforming codebook) are considered to maximize main beam power. Aspects provide a power-efficient and fast beam tracking method in devices using a single-RF-chain (analog beamforming) mmWave communication system. Aspects provide apparatuses and methods to perform beamforming in an analog beamforming architecture. In aspects, two sets of codebooks are used in beamforming and, by switching between code words and codebooks, an apparatus can find a best beam direction without changing the effective channel of operation and disrupting communication.

Figure 15:
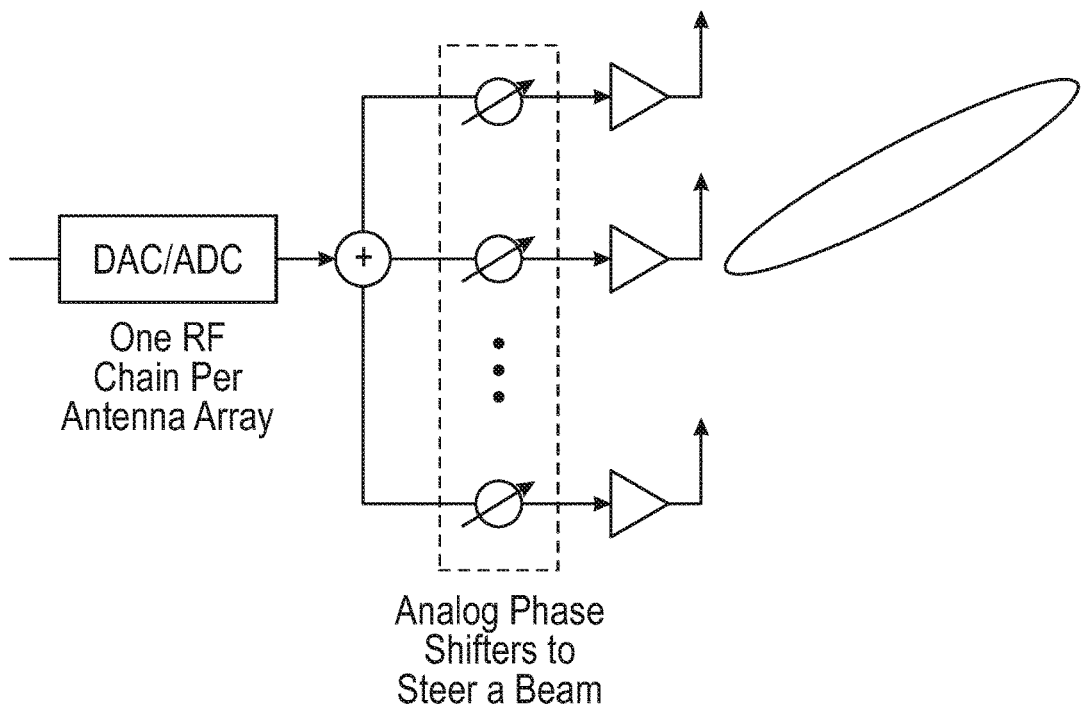
FIG. 15 illustrates an analog beamforming architecture in accordance with some aspects.

FIG. 15 illustrates an analog beamforming architecture 1500 in accordance with some aspects. In at least some aspects, the architecture 1500 uses phase shifters 1502 connected to antenna elements 1504 to combine a signal received in the analog domain. The architecture uses one DAC/ADC pair (RF-chain 1506). By using the phase shifters 1502, one beam 1508 can be generated, with different beam patterns and various beam steering directions.

Figure 16:
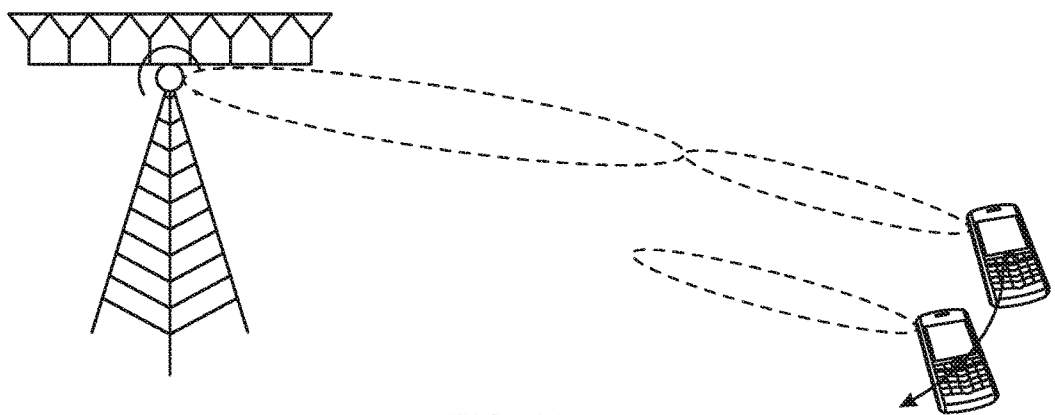
FIG. 16 illustrates the impact of mobility on beam steering according to some aspects.

FIG. 16 illustrates the impact of mobility on beam steering according to some aspects. Narrow beamforming can produce the highest gains for stationary users. However, narrow beamforming can lead to beam steering errors and loss of communication links for mobile users, particular mobile users who move at high speeds (e.g., vehicles). For example, base station 1602 can transmit a beam 1604 to reach user 1606. However, if user 1606 moves to a new position as shown, the beam 1604 can no longer be received by the user 1606.

Figure 17:
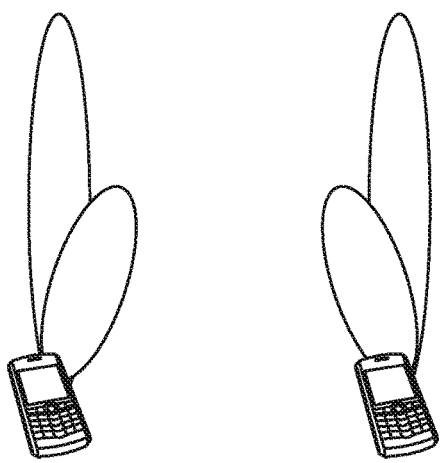
FIG. 17 illustrates multi-finger asymmetrical beamforming according to some aspects.

FIG. 17 illustrates multi-finger asymmetrical beamforming according to some aspects. In aspects implementing multi-finger asymmetrical beamforming, each user equipment (UE) 1700 can generate one main lobe 1702 having a larger beamforming gain, and one secondary lobe 1704 with lower beamforming gain adjacent to main lobe 1702. Multi-finger beamforming patterns can be symmetrical with respect to main lobe as shown in FIG. 17. In addition, the two beamforming patterns can be designed such that the received signal after beamforming has a similar beamforming gain if direction of arrival is within half power beam width of main lobe 1702.

Figures 18A, 18B:
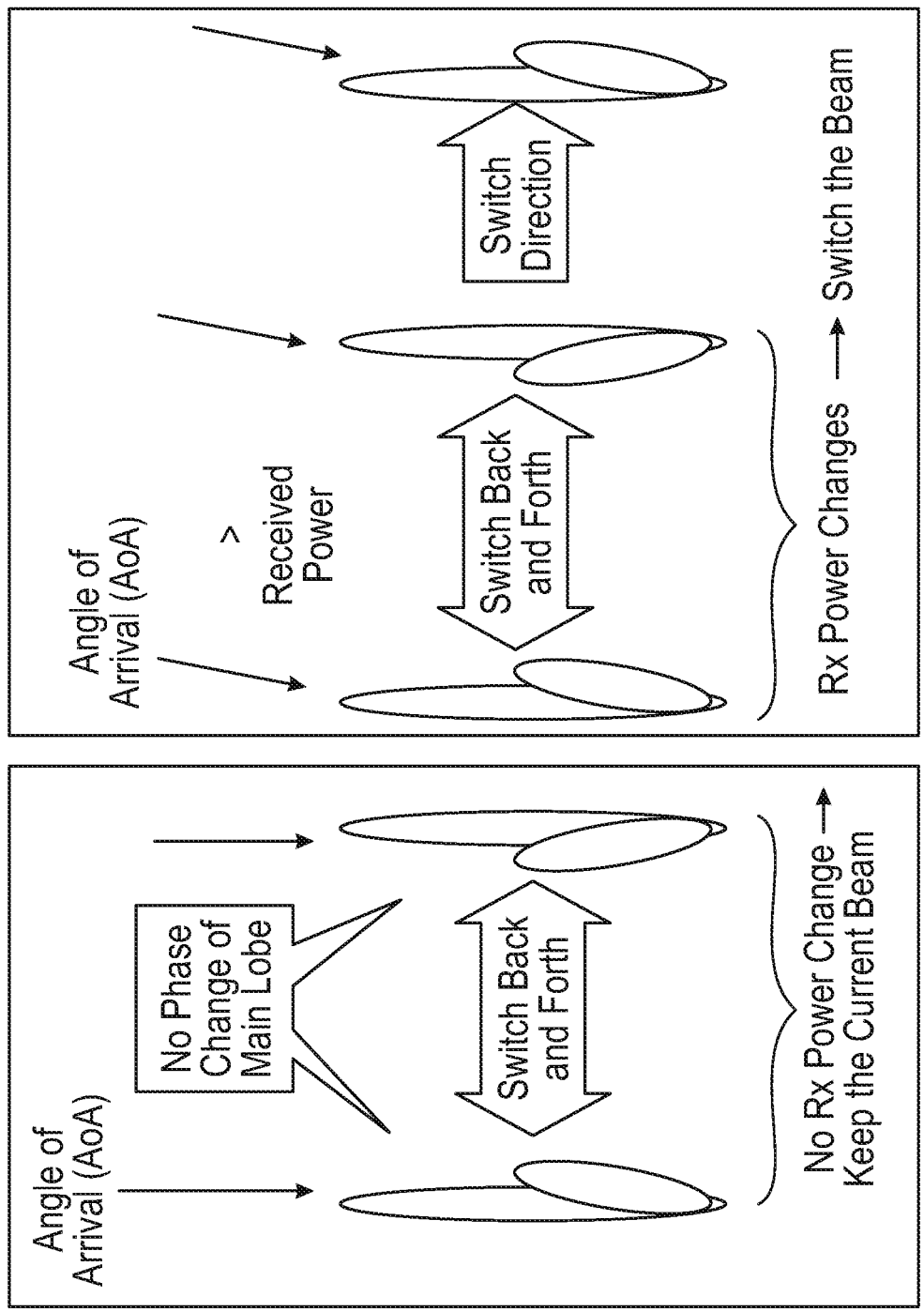
FIG. 18A illustrates multi-finger asymmetrical beamforming for beam tracking when a user equipment (UE) is stationary according to some aspects.
FIG. 18B illustrates multi-finger asymmetrical beamforming for beam tracking when a user equipment (UE) is mobile according to some aspects.

FIG. 18A illustrates multi-finger asymmetrical beamforming for beam tracking when a UE is stationary according to some aspects. FIG. 18B illustrates multi-finger asymmetrical beamforming for beam tracking when a user equipment (UE) is mobile according to some aspects. In order to track the channel, the UE processing circuitry (e.g., baseband processor 110, (FIG. 1)) switches the beamforming vector back and forth between the patterns as shown in FIGS. 18A and 18B. The UE processing circuitry can change the beam at the beginning of each frame such that the UE can estimate the channel with the switched beamforming pattern.

In the non-mobile (stationary) situation illustrated in FIG. 18A, the angle of arrival 1800 of the received signal will remain the same. The beams 1802 and 1804 are designed to have similar beamforming gain, and the UE will not observe any change in the channel gain. Therefore, the UE can continue communication without disruption using the same (current) beam direction.

In the high-mobility situation illustrated in FIG. 18B, when angle of arrival 1806 of the received signal changes quickly, the UE will observe two different channel gains. If the beamforming pattern of the secondary lobe is in the direction of new angle of arrival, the received signal power will be larger as compared to other beamforming pattern. For example, as illustrated, if the beamforming pattern of the secondary lobe 1808 is in the direction of the new angle of arrival 1810, the received signal power of beamforming pattern 1812 will be larger as compared to other beamforming pattern 1814. Then, the UE steers its beam 1816 towards the direction of secondary beam 1808 of the beam pattern 1812 that has highest channel gain as shown in FIG. 18B.

Figure 19:
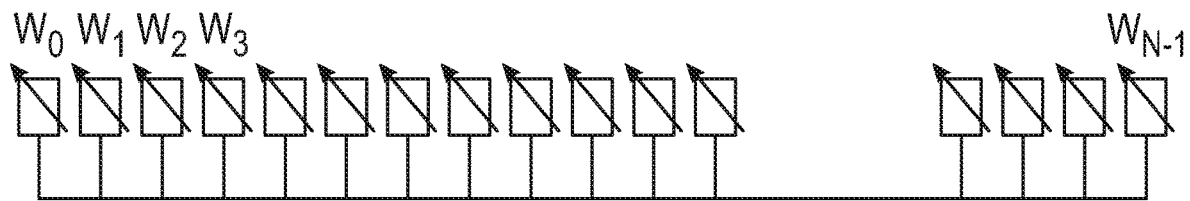
FIG. 19 illustrates a uniform linear antenna array according to some aspects.

FIG. 19 illustrates a uniform linear antenna array 1900 according to some aspects. While a linear antenna array 1900 is depicted, other array types (e.g., rectangular) can be used. Antenna elements 1902 can be spaced by an amount 1904 given by d=λ/2 where λ is wavelength of carrier frequency.

The beamforming vector can be designed as described below.

First, letting phase and amplitude excitation of antennas by denoted:

$$w=[w_0, w_1, \ldots, w_{N-1}]^T$$

where $|w_n|=1, n=1, \ldots, N-1$ (15)

The far field radiation pattern at azimuth angle θ is given by $$d(\theta)=a^H(\theta)w \quad (16)$$

where $a(\theta)=[1, e^{j(\pi \cos(\theta))}, \ldots, e^{j((N-1)\cos(\theta))}]^T$ (17)

An antenna radiation pattern function $f(\theta)$ can also be defined wherein $0 \le \theta \le 180°$.

Next, defining the main lobe angle and secondary lobe angle as $\theta_{l,1}$ and $\theta_{l,2}$, respectively, a set of angles can be defined to apply an upper bound on side lobes:

$$\theta_{p,i}, i=1, \ldots, L \quad (18)$$

The desired radiation pattern for azimuth angles $\theta_{l,1}$ and $\theta_{l,2}$ can be given as $d_1=d(\theta_{l,1})$ and $d_2=d(\theta_{l,2})$, respectively.

Next, a least square minimization problem for the azimuth angles $\theta_{l,i}$, i=1, ..., K can be given as:

$$\min_w c_1|d_1 e^{j\varphi_1} - f(\theta_{l,1})a^H(\theta_{l,1})w|^2 + c_2|d_2 e^{j\varphi_2} - f(\theta_{l,2})a^H(\theta_{l,2})w|^2, \quad (19)$$

such that $|f(\theta_{p,l})a^H(\theta_{p,l})w|^2 \le P_l, l=1, \ldots, L$ $|w_n| = 1, n = 0, \ldots, N-1$ where $\varphi_k = \arg(a^H(\theta_{l,k})w)$, and $c_k$ is the least square weights for azumith angle $\theta_{l,k}$ for k=1, 2.

Note that the above problem in (19) is an NP hard problem. The solution of the optimization problem (19) provides a multi-finger beamforming vector w that generates desired main and secondary lobes and reduced side lobes.

Figure 20:
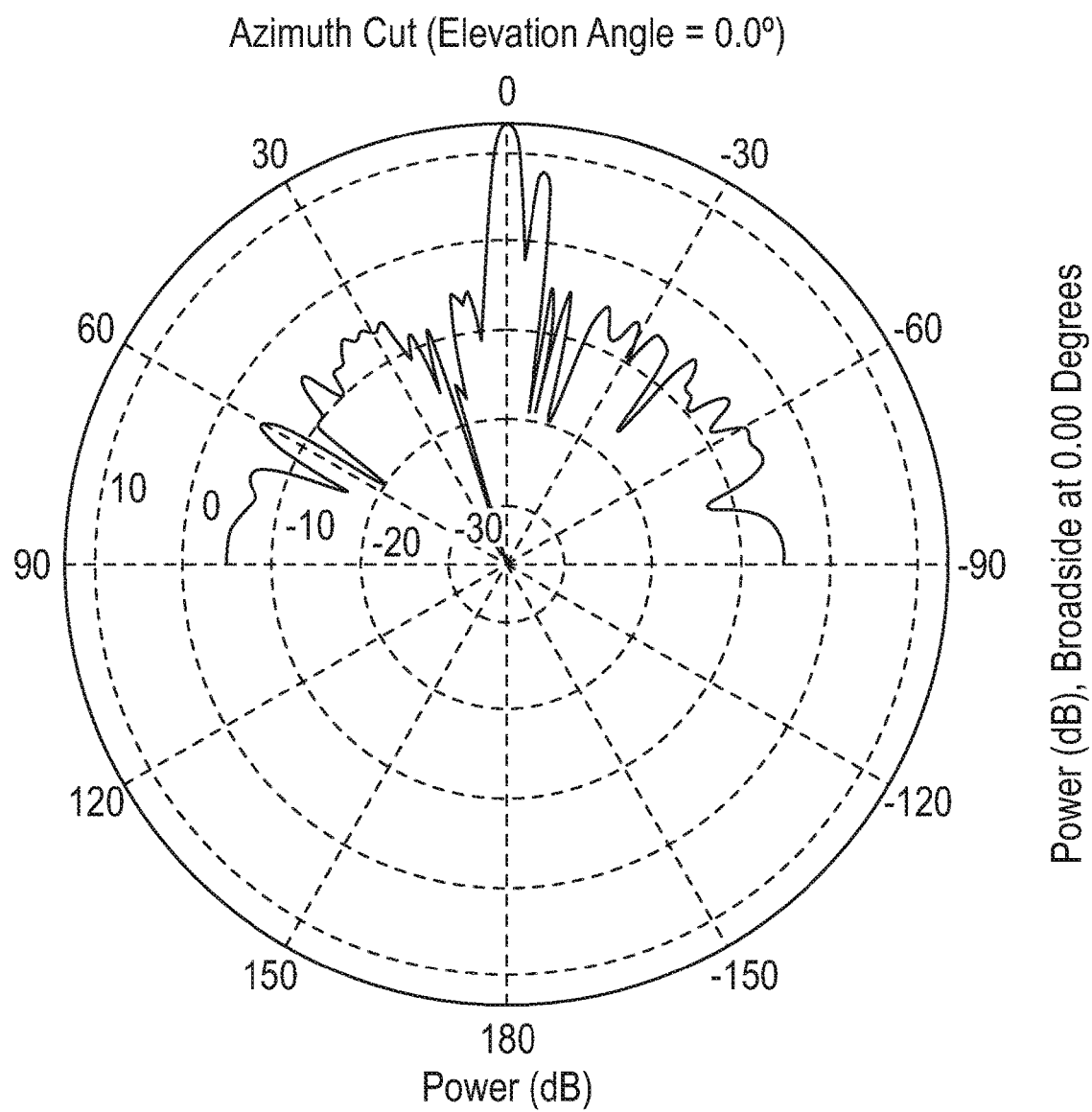
FIG. 20 illustrates direction of an optimized beam forming vector according to some aspects.

FIG. 20 illustrates direction of an optimized beam forming vector according to some aspects. Although the above optimization problem is flexible to generate beams in any direction, methods and apparatuses according to aspects will generate a single optimized beam forming vector $w_{opt}$ that has main lobe at the broadside angle, i.e., 0° as shown in FIG. 20.

Aspects also provide a DFT matrix as a beam steering codebook. A DFT matrix can be given as follows:

$$A \in \mathbb{C}^{NO \times N} = \begin{bmatrix} a_1^T \\ \vdots \\ a_k^T \\ \vdots \\ a_{NO}^T \end{bmatrix} = \begin{bmatrix} 1 & e^{j\frac{2\pi}{NO}} & \ldots & e^{j\frac{2\pi(N-1)}{NO}} \\ \vdots & \vdots & \vdots & \vdots \\ 1 & e^{j\frac{2\pi k}{NO}} & \ldots & e^{j\frac{2\pi(N-1)k}{NO}} \\ \vdots & \vdots & \vdots & \vdots \\ 1 & e^{j\frac{2\pi NO}{NO}} & \ldots & e^{j\frac{2\pi(N-1)NO}{NO}} \end{bmatrix} \quad (20)$$

where O is oversampling ratio, and $$a_k^T = \left[1, e^{j\frac{2\pi k}{NO}}, \ldots, e^{j\frac{2\pi(N-1)k}{NO}}\right]$$

Here, DFT codebook index k corresponding to desired steering angle θ is given by k=

$$\left\lfloor \frac{NO}{2} \cos(\theta) \right\rfloor$$

where $\lfloor \cdot \rfloor$ is an operator to find closest integer.

Assuming that the UE processing initially knows the best beamforming direction and DFT codeword index k*, UE processing circuitry can then obtain steered beamforming vectors by multiplying $w_{opt}$ by $a_{k*}$ elementwise as follows $$s_1 = w_{opt} \text{diag}(a_{k*}) \quad (21)$$

$$s_2 = w_{opt} \text{diag}(a_{k*}) \quad (22)$$

where $(.)^H$ is conjugate operation and diag(.) is diagonalization of the beamforming vector.

Given received signal by r, UE processing circuitry can check the following conditions: First, if received signal strength after beamforming vector $s_1$ is larger than $s_2$, according to (23), then the DFT codebook index is increased by 1 (k*←k*+1) to steer the beam towards direction of secondary beam of $s_1$. In (21), ∈ is a threshold to prevent frequent beam switching.

$$\|s_1^T r\|_2^2 > \|s_2^T r\|_2^2 + \in \quad (23)$$

Second, if received signal strength after beamforming vector $s_2$ is larger than $s_1$ according to (24), $$\|s_2^T r\|_2^2 > \|s_1^T r\|_2^2 + \in \quad (24)$$

Then, we decrease DFT codebook index by 1 (k*←k*-1) to steer the beam towards the direction of secondary beam of $s_2$.

Otherwise, if neither the first nor the second condition holds, the UE processing circuitry keeps the beamforming index k* the same.

By implementing beamforming as described above with reference to Equations (15)-(19), and then beam steering in the direction of the strongest received signal strength, the UE processing circuitry can maintain communications even during high-mobility situations such as in vehicular applications.

Figure 21:
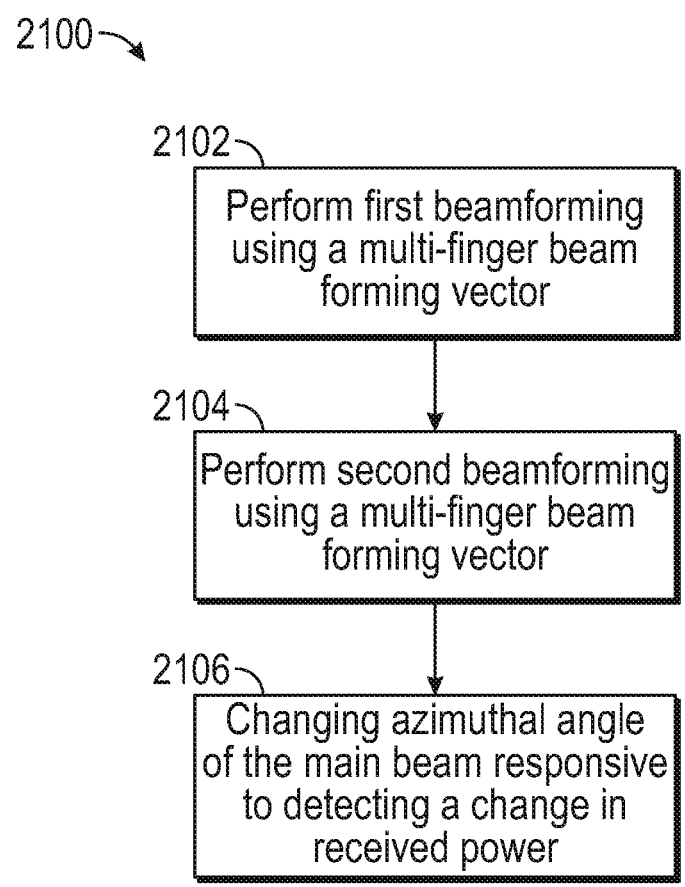
FIG. 21 illustrates a method for bream tracking using a multi-finger beam according to some aspects.

FIG. 21 illustrates a method 2100 for bream tracking using a multi-finger beam according to some aspects. The method 2100 can be performed by UE processing circuitry (e.g. baseband processor 110 (FIG. 1)).

The method 2100 begins with operation 2102 with the processing circuitry performing a beamforming function at a first subframe of a first frame, using a multi-finger beam forming vector to generate a first multi-finger beamforming pattern. The first multi-finger beamforming pattern can include a main beam and a first secondary beam. In aspects, the first secondary beam has lower beamforming gain than the main beam.

The method 2100 continues with operation 2104 with the processing circuitry performing the beamforming function at a first subframe of a second frame subsequent to the first frame, using a multi-finger beam forming vector to generate a second multi-finger beamforming pattern. The second multi-finger beamforming pattern can include the same main beam from operation 2102 and a different secondary beam. In aspects, the first secondary beam is at a first azimuthal angle from the main beam and the second secondary beam is at a second azimuthal angle from the main beam symmetrical to the first secondary beam about an axis going through the main beam. In aspects, the processing circuitry is configured to determine the azimuthal angles according to a least square minimization problem as described earlier herein at least with reference to Equations (16)-(19).

The method 2100 continues with operation 2106 with the processing circuitry changing azimuthal angle of the main beam in subsequent frames responsive to detecting a change in received power between the first frame and the second frame. In aspects, the azimuthal angle of the main beam is changed to correspond to a direction of either of the first secondary beam or the second secondary beam, depending on whether the processing circuitry detected higher gain in the corresponding first frame or second frame. In aspects, the azimuthal angle is changed by incrementing or decrementing an index of a DFT codebook as described above with reference to Equations (20)-(23).

Blind Beam Tracking for Multiple Beams in 5G mmWave for Improved SNR and Interference Mitigation Beam tracking algorithms are used in current systems to acquire beams. Some beam tracking algorithms include blind tracking algorithms in high-speed (e.g., vehicular) applications. However, such blind tracking algorithms are currently limited to the ability to track one beam at a time. It would be helpful to be able to track two or more beams quickly, to use the two or more beams for improved signal to noise ratio (SNR). Further, multiple beam tracking can improve beam acquisition in the presence of a strong interferer by allowing UEs to track the interferer in parallel and remove interferer transmit power. Finally, multiple beam tracking is useful in a multi-use MIMO setting on the base station side to help base stations track multiple users.

Methods and apparatuses according to aspects can reduce hardware complexity by reducing the number of FFTs at the receiver. The algorithms provided according to some aspects can scale to multiple users through multiple parallel tracking chains, one for each user. Algorithms according to aspects can track the strongest beam, determine the weights corresponding to the strongest beam, project the received signal in the orthogonal direction corresponding to the strongest beam, and repeat the process to track multiple parallel beams in an order according to received signal power.

Multiple beams can be tracked in high mobility situations, even when angle of arrival changes frequently. The tracking capability is a function of sampling frequency, meaning that for faster tracking, higher sampling frequency can still be used to track accurately, regardless of signal bandwidth or signal properties and without timing or frequency synchronization.

Blind algorithms can also track in the presence of interference because the interfering beam can be tracked. This is because blind algorithms operate in the time domain and are agnostic to the signal, and do not depend on pilots. By projecting on the orthogonal direction, blind tracking algorithms minimize interference.

Assume a fully digital mmWave architecture, where apparatuses and methods according to aspects can access the signals after ADC at the output of each RF chain for every antenna. A simple flat fading scenario wherein the signal received at the k-th antenna is given as follows:

$$y_k(t)=h_k x(t)+n(t) \quad (25)$$

where $y_k(t)$ is the signal received at the k-th antenna.

In vector form (25) can be written as $$y(t)=hx(t)+n(t) \quad (26)$$

$$\text{where channel matrix } h=\Sigma_c\Sigma_m g^{cm}a(\theta_m) \quad (27)$$

$$a(\theta)=[1 e^{j\pi \sin\theta} \ldots e^{j(K-1)\pi \sin\theta}] \quad (28)$$

and where $g_{cm}$ is the complex gain of the m-th element in the c-th cluster, c is the number of clusters, m is the number of angles in a cluster, and $\theta_m$ is the angle of the different reflections.

Assume a blind algorithm that provides the weights $w_k^*$ to track a single beam, where $z_k(t)$ is a single output signal.

$$z_k(t)=w_k^* y_k(t)=w_k^* h_k x(t)+w_k^* n(t) \quad (29)$$

The weights are determined by the algorithm that maximizes the output power:

$$r(t) = \sum_k z_k(t) = \sum_k w_k^* y_k(t) \quad (30)$$

An example of such an algorithm is using an Equal Gain Combining technique that maximizes the output power, where μ is a learning rate:

$$w_k=e^{j\theta_k} \quad (31)$$

$$\theta_k=\theta_k-\mu \, \text{Im}\{z_i(t)z_k^*(t)\} \quad (32)$$

Because the above blind technique has no knowledge of the channel, it is not known how many clusters exist. Given this degree of freedom, the blind technique will converge in a way to maximize combined output power. In other words, $\theta_k$ will converge to the beam in the strongest direction. For example, assuming multiple clusters with one cluster having significantly higher power than the others, then the blind algorithm described at Equation (29) is likely to converge to the main (maximum combined power) cluster. This can be useful for tracking one beam, but if there are multiple reflections and multiple beams, tracking can become difficult or unattainable for those other reflections/beams.

To build the second (lower-power) beam for the second cluster (e.g., to discover $\theta_2$ for a next-strongest beam subsequent to having discovered $\theta_1$ for the strongest beam), methods according to aspects will remove the cluster effect of the first cluster before re-converging is performed. Without removing the first cluster effect, attempts to track the second beam will instead converge on a degenerated version of the first beam, rather than on the actual second beam. To remove the cluster effect of the first cluster, it is first assumed that the first beam (corresponding to highest power) has converged such that θ has been obtained as the angle of the first beam. Then, algorithms according to aspects use the first beam weight vector to suppress energy from the first beam, leaving the residual energy for the rest of the beams. Next, algorithms according to aspects can then re-apply the blind technique to find the second cluster. The suppression can be achieved by projecting the signal on to the orthogonal space to the original beam direction. Convergence speed can be increased by properly initializing the M multiple beams.

An algorithm for multiple beam tracking, according to some aspects, can first initialize M beams in M different directions (with a small correlation between beams or orthogonal beams) such that:

$$w_m \neq w_l \text{ for } m \neq l \quad (33)$$

Denote $S_m$ as subspace spanned by columns of $$W_{\overline{m}} = [w_1 w_2 \ldots w_{m-1} w_{m+1} \ldots w_M] \quad (34)$$

Further denote $S_m^\perp$ as the orthogonal complement subspace of $S_m$.

The overall received signal y(t) can be decomposed into two orthogonal components: one component lying in Subspace $S_m$ and the other component in $S_m^\perp$ $$y(t) = P_{S_m} y(t) + P_{S_m^\perp} y(t) \quad (35)$$

where $$P_{S_m} = W_{\overline{m}} (W_{\overline{m}}^H W_{\overline{m}})^{-1} W_{\overline{m}}^H \quad (36)$$

is a projection matrix onto subspace $S_m$ $$P_{S_m^\perp} = I - P_{S_m} \quad (37)$$

is a projection matrix onto subspace $S_m^\perp$.

Note that $\tilde{y}_m(t) = P_{S_m^\perp} y(t)$ does not contain energy from the direction $w_l$ for $l \neq m$, $l = 1, \ldots, M$.

$w_m$ is updated based on $\tilde{y}_m(t)$ and given that $w_{m,k} = e^{j\theta_{m,k}}$ =k-th element of $w_m$.

To update $w_m$, systems and methods according to aspects can use a single beam tracking blind algorithm:

$$\theta_{m,k} = \theta_{m,k} + \mu \, \text{Im}\{z_{m,k}(t) r_m^*(t)\} \quad (38)$$

where $$r_m(t) = \sum_k z_{m,k}(t) = \sum_k w_{m,k}^* \tilde{y}_{m,k}(t) \quad (39)$$

Next systems and methods according to aspects update all the projection matrices $P_{S_m^\perp}$.

Example projection matrices for two beams can be given as:

$$P_{S_1^\perp} = I - \frac{w_2 w_2^H}{K} \text{ and} \quad (40)$$

$$P_{S_2^\perp} = I - \frac{w_1 w_1^H}{K} \quad (41)$$

The above processing can then be repeated for a third beam, or until no more beams are detected. Processing can be limited to a certain number of beams, or to detection of a beam with a power threshold, for example.

Figure 22:
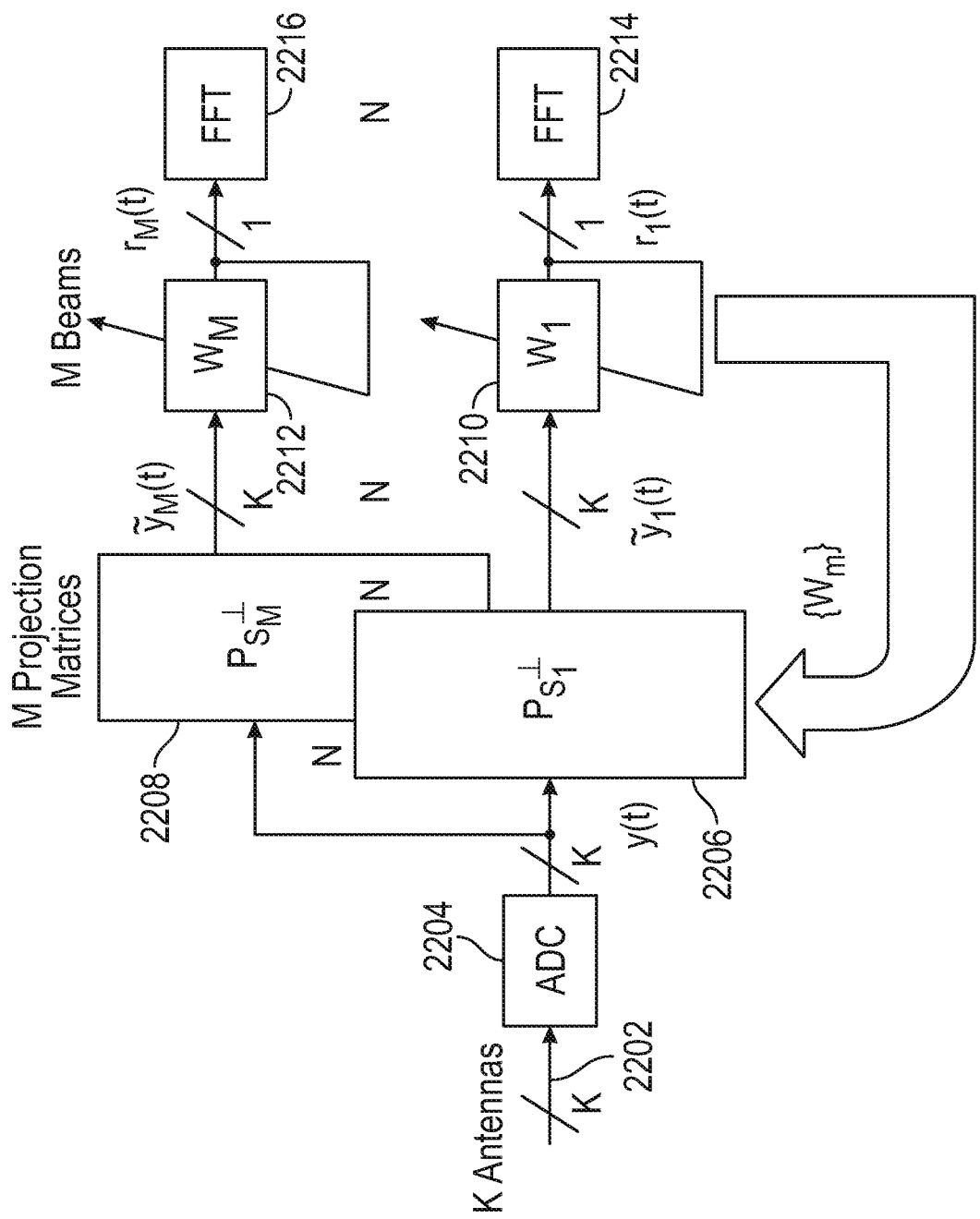
FIG. 22 illustrates an architecture for blind beam tracking of multiple beams according to some aspects.

FIG. 22 illustrates an architecture 2200 for blind beam tracking of multiple beams according to some aspects. Some elements of architecture 2200 can be implemented by processing circuitry (e.g., baseband processor 110 (FIG. 1)). Signals are received at 2202 from k antennas and provided to ADC 2204, which generates signal y(t) at 2206. Processing circuitry then generates projection matrices similarly to Equation (35) above, at blocks 2206 and 2208. Up to M projection matrices may be generated.

Next the processing circuitry applies M projection matrices to signal y(t) to generate up to M $\tilde{y}_m(t)$ signals. Next, at blocks 2210 and 2212, weights matrices are updated using, for example, single beam tracking blind algorithm of Equation (38). Each individual beam that has been tracked is then provided at FFTs 2214 and 2216 for further processing.

Figure 23:
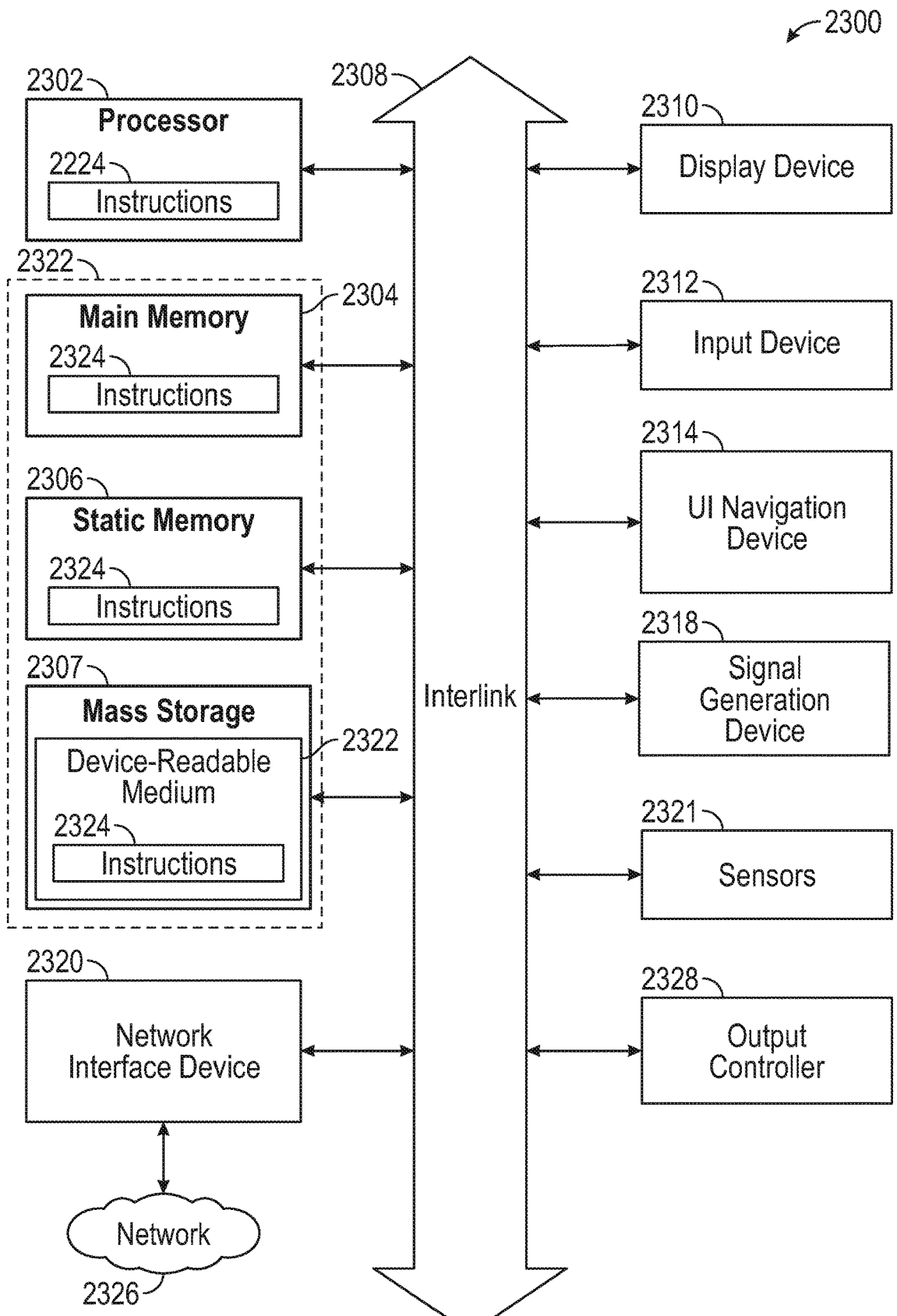
FIG. 23 is a block diagram illustrating an example of a machine upon which one or more aspects may be implemented.

FIG. 23 illustrates a block diagram of an example machine 2300 upon which any one or more of the techniques (e.g., methodologies) discussed herein may be performed, for example, any of a beam sweeping and beam tracking operation.

Examples, as described herein, may include, or may operate by, logic or a number of components, or mechanisms in the machine 2300. Circuitry (e.g., processing circuitry) is a collection of circuits implemented in tangible entities of the machine 2300 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 2300 follow.

In alternative aspects, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in peer-to-peer (P2P) (or other distributed) network environment. The machine 2300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 2300 may include a hardware processor 2302 (e.g., a central processing unit (CPU), a graphics processing unit (GPU), a hardware processor core, or any combination thereof), a main memory 2304, a static memory (e.g., memory or storage for firmware, microcode, a basic-input-output (BIOS), unified extensible firmware interface (UEFI), etc.) 2306, and mass storage 2308 (e.g., hard drive, tape drive, flash storage, or other block devices) some or all of which may communicate with each other via an interlink (e.g., bus) 2330. The machine 2300 may further include a display unit 2310, an alphanumeric input device 2312 (e.g., a keyboard), and a user interface (UI) navigation device 2314 (e.g., a mouse). In an example, the display unit 2310, input device 2312 and UI navigation device 2314 may be a touch screen display. The machine 2300 may additionally include a storage device (e.g., drive unit) 2308, a signal generation device 2318 (e.g., a speaker), a network interface device 2320, and one or more sensors 2316, such as a global positioning system (GPS) sensor, compass, accelerometer, or other sensor. The machine 2300 may include an output controller 2328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 2302, the main memory 2304, the static memory 2306, or the mass storage 2308 may be, or include, a machine readable medium 2322 on which is stored one or more sets of data structures or instructions 2324 (e.g., software) embodying or utilized by any one or more of the techniques or functions described herein. The instructions 2324 may also reside, completely or at least partially, within any of registers of the processor 2302, the main memory 2304, the static memory 2306, or the mass storage 2308 during execution thereof by the machine 2300. In an example, one or any combination of the hardware processor 2302, the main memory 2304, the static memory 2306, or the mass storage 2308 may constitute the machine readable media 2322. While the machine readable medium 2322 is illustrated as a single medium, the term "machine readable medium" may include a single medium or multiple media (e.g., a centralized or distributed database, and/or associated caches and servers) configured to store the one or more instructions 2324.

The term "machine readable medium" may include any medium that is capable of storing, encoding, or carrying instructions for execution by the machine 2300 and that cause the machine 2300 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2324 may be further transmitted or received over a communications network 2326 using a transmission medium via the network interface device 2320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2320 may include one or more physical jacks (e.g., Ethernet, coaxial, or phone jacks) or one or more antennas to connect to the communications network 2326. In an example, the network interface device 2320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2300, and includes digital or analog communications signals or other intangible medium to facilitate communication of such software. A transmission medium is a machine readable medium.

EXAMPLES

Example 1 is an apparatus for a wireless communication device, comprising: an antenna array including $N_r$ antennas and $$\frac{N_r}{N_r^{rf}}$$

antenna sub-arrays, where $N_r^{rf}$ is the number of RF-chains of the apparatus; and processing circuitry configured to perform a beamforming function at the $$\frac{N_r}{N_r^{rf}}$$

antenna sub-arrays; determine the angle of arrival of a received signal received in response to performing the beamforming function; and adjust phase shifters of the apparatus according to the angle of arrival.

Example 2 can include the subject matter for Example 1, wherein the angle of arrival is determined by: steering each sub-array toward each of $$\frac{N_r}{N_r^{rf}} \frac{2d}{\lambda}$$

grating angles, where d is the distance between each sub-array and λ is the wavelength of the received signal; and selecting the grating angle having the largest measured power gain as the angle of arrival.

Example 3 can include the subject matter for Examples 1-2, wherein the steering is performed using a discrete Fourier transform (DFT) codebook.

Example 4 can include the subject matter for Examples 1-3, wherein the DFT codebook has a size of $$\frac{N_r}{N_r^{rf}} \times \frac{N_r}{N_r^{rf}}.$$

Example 5 can include the subject matter for Examples 1-4, wherein the beamforming function is performed using beamforming vector that has been applied to each antenna sub-array of the $$\frac{N_r}{N_r^{rf}}$$

sub-arrays such that an array pattern of each antenna sub-array is substantially the same.

Example 6 is an apparatus of a wireless communication device comprising an antenna array; and processing circuitry coupled to the antenna array and configured to: perform a beamforming function at a first subframe of a first frame, using a multi-finger beam forming vector to generate a first multi-finger beamforming pattern, the first multi-finger beamforming pattern including a main beam and a first secondary beam; perform the beamforming function at a first subframe of a second frame subsequent to the first frame, using a multi-finger beam forming vector to generate a second multi-finger beamforming pattern, the second multi-finger beamforming pattern including the main beam and a second secondary beam; and change azimuthal angle of the main beam in subsequent frames responsive to detecting a change in received power between the first frame and the second frame.

Example 7 can include the subject matter of Example 6, wherein the first secondary beam has lower beamforming gain than the main beam.

Example 8 can include the subject matter of Examples 6-7, wherein the first secondary beam being at a first azimuthal angle from the main beam and wherein the second secondary beam is at a second azimuthal angle from the main beam symmetrical to the first secondary beam about an axis going through the main beam.

Example 9 can include the subject matter of Examples 6-8, wherein the azimuthal angle of the main beam is changed to correspond to a direction of either of the first secondary beam or the second secondary beam.

Example 10 can include the subject matter of Examples 6-9, wherein the azimuthal angle of the main beam is changed to correspond to a beam direction during the frame at which the apparatus detected highest channel gain.

Example 11 can include the subject matter of Examples 1-10, wherein the azimuthal angle is changed to correspond to a beam direction of a corresponding secondary beam during the frame at which the apparatus detected highest channel gain.

Example 12 can include the subject matter of Examples 1-11, wherein the azimuthal angle is changed by incrementing or decrementing an index of a discrete Fourier transform (DFT) codebook.

Example 13 can include the subject matter of Examples 1-12, wherein the processing circuitry is configured to determine the azimuthal angle of the main beam according to a least square minimization problem.

Example 14 is an apparatus of a wireless communication device, comprising: an antenna array configured to receive a signal including a plurality of beams; and processing circuitry coupled to the antenna array and configured to detect a first beam of the plurality of beams received at the antenna array; suppress energy from the first beam within the received signal based on a weight vector corresponding to the first beam; and detect a second beam within the received signal subsequent to having suppressed energy from the first beam within the received signal.

Example 15 includes the subject matter of Example 14, wherein the processing circuitry is further configured to: suppress energy from the second beam within the received signal based on a weight vector corresponding to the second beam; and detect a third beam within the received signal subsequent to having suppressed energy from the second beam within the received signal.

Example 16 includes the subject matter of Examples 14-15, wherein the processing circuitry suppresses energy from the first beam by projecting the received signal onto a space orthogonal to a direction of the first beam.

Example 17 includes the subject matter of Examples 14-16, wherein the processing circuitry detects the first beam and the second beam using a blind algorithm and in the absence of a pilot signal.

Example 18 includes the subject matter of Examples 14-17 wherein the blind algorithm includes an Equal Gain Combining technique to maximize output power.

Example 19 can include methods for performing operations described in any of Examples 1-18.

Example 20 can include a system having means for performing operations described in any of Examples 1-18.

Example 21 can include computer-readable media including instructions for performing operations described in any of Examples 1-18.

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

What is claimed is:

1. An apparatus of a wireless communication device, comprising:
    an antenna array including $N_r$ antennas and
    $$\frac{N_r}{N_r^{rf}}$$
    antenna sub-arrays, where $N_r^{rf}$ indicates a number of RF-chains of the apparatus; and
    processing circuitry configured to:
        perform a beamforming function at the
        $$\frac{N_r}{N_r^{rf}}$$
        antenna sub-arrays;
        determine an angle of arrival of a received signal received in response to performing the beamforming function, wherein the angle of arrival is determined by:
            steering each sub-array toward each of
            $$\frac{N_r}{N_r^{rf}} \frac{2d}{\lambda}$$
            grating angles, where d is the distance between each sub-array and $\lambda$ is the wavelength of the received signal; and
        selecting the grating angle having the largest measured power gain as the angle of arrival; and
        adjust phase shifters of the apparatus according to the angle of arrival.

2. The apparatus of claim 1, wherein the steering is performed using a discrete Fourier transform (DFT) codebook.

3. The apparatus of claim 2, wherein the DFT codebook has a size of
$$\frac{N_r}{N_r^{rf}} \times \frac{N_r}{N_r^{rf}}.$$

4. The apparatus of claim 1, wherein the beamforming function is performed using beamforming vector that has been applied to each antenna sub-array of the
$$\frac{N_r}{N_r^{rf}}$$
sub-arrays such that an array pattern of each antenna sub-array is substantially the same.

5. An apparatus of a wireless communication device, comprising:
    an antenna array; and
    processing circuitry coupled to the antenna array and configured to:
        perform a beamforming function at a first subframe of a first frame, using a multi-finger beam forming vector to generate a first multi-finger beamforming pattern, the first multi-finger beamforming pattern including a main beam and a first secondary beam;
        perform the beamforming function at a first subframe of a second frame subsequent to the first frame, using a multi-finger beam forming vector to generate a second multi-finger beamforming pattern, the second multi-finger beamforming pattern including the main beam and a second secondary beam; and
        change azimuthal angle of the main beam in subsequent frames responsive to detecting a change in received power between the first frame and the second frame.

6. The apparatus of claim 5, wherein the first secondary beam has lower beamforming gain than the main beam.

7. The apparatus of claim 5, wherein the first secondary beam being at a first azimuthal angle from the main beam and wherein the second secondary beam is at a second azimuthal angle from the main beam symmetrical to the first secondary beam about an axis going through the main beam.

8. The apparatus of claim 7, wherein the azimuthal angle of the main beam is changed to correspond to a direction of either of the first secondary beam or the second secondary beam.

9. The apparatus of claim 7, wherein the azimuthal angle of the main beam is changed to correspond to a beam direction during the frame at which the apparatus detected highest channel gain.

10. The apparatus of claim 9, wherein the azimuthal angle is changed to correspond to a beam direction of a corresponding secondary beam during the frame at which the apparatus detected highest channel gain.

11. The apparatus of claim 10, wherein the azimuthal angle is changed by incrementing or decrementing an index of a discrete Fourier transform (DFT) codebook.

12. The apparatus of claim 5, wherein the processing circuitry is configured to determine the azimuthal angle of the main beam according to a least square minimization problem.

13. An apparatus of a wireless communication device, comprising:
- an antenna array configured to receive a signal including a plurality of beams; and
- processing circuitry coupled to the antenna array and configured to:
  - detect a first beam of the plurality of beams received at the antenna array;
  - suppress energy from the first beam within the received signal based on a weight vector corresponding to the first beam; and
  - detect a second beam within the received signal subsequent to having suppressed energy from the first beam within the received signal.

14. The apparatus of claim 13, wherein the processing circuitry is further configured to:
- suppress energy from the second beam within the received signal based on a weight vector corresponding to the second beam; and
- detect a third beam within the received signal subsequent to having suppressed energy from the second beam within the received signal.

15. The apparatus of claim 13, wherein the processing circuitry suppresses energy from the first beam by projecting the received signal onto a space orthogonal to a direction of the first beam.

16. The apparatus of claim 13, wherein the processing circuitry detects the first beam and the second beam using a blind algorithm and in the absence of a pilot signal.

17. The apparatus of claim 16, wherein the blind algorithm includes an Equal Gain Combining technique to maximize output power.

* * * * *